United States Patent
Maruno et al.

(10) Patent No.: US 10,474,132 B2
(45) Date of Patent: Nov. 12, 2019

(54) INFORMATION PROCESSING DEVICE, INFORMATION PROCESSING METHOD, AND RECORDING MEDIUM

(71) Applicant: OMRON Corporation, Kyoto (JP)

(72) Inventors: Ryota Maruno, Kusatsu (JP); Yutsuka Shigemori, Kusatsu (JP)

(73) Assignee: OMRON Corporation, Kyoto (JP)

( * ) Notice: Subject to any disclaimer, the term of this patent is extended or adjusted under 35 U.S.C. 154(b) by 84 days.

(21) Appl. No.: 15/869,073

(22) Filed: Jan. 12, 2018

(65) Prior Publication Data

US 2018/0284722 A1 Oct. 4, 2018

(30) Foreign Application Priority Data

Mar. 29, 2017 (JP) ................................. 2017-065968

(51) Int. Cl.
*G06F 19/00* (2018.01)
*G05B 19/408* (2006.01)
*G05B 19/4155* (2006.01)
*G05B 19/4062* (2006.01)

(52) U.S. Cl.
CPC ..... *G05B 19/4083* (2013.01); *G05B 19/4062* (2013.01); *G05B 19/4155* (2013.01); *G05B 2219/32128* (2013.01); *G05B 2219/33119* (2013.01)

(58) Field of Classification Search
CPC .............. G05B 19/4083; G05B 19/409; G05B 19/4062; G05B 19/4155; G05B 2219/35488; G05B 2219/32128; G05B 2219/33119; Y02P 90/265
See application file for complete search history.

(56) References Cited

U.S. PATENT DOCUMENTS

| | | | |
|---|---|---|---|
| 10,248,090 B2 * | 4/2019 | Mizuno | ................... H02P 25/06 |
| 2014/0163738 A1 | 6/2014 | Suzuki | |
| 2014/0309751 A1 * | 10/2014 | Nagata | ................. G05B 19/409 |
| | | | 700/12 |
| 2016/0231733 A1 * | 8/2016 | Nagatani | ............ G05B 19/0426 |

(Continued)

FOREIGN PATENT DOCUMENTS

| DE | 112015006392 | 12/2017 |
|---|---|---|
| WO | 2016157395 | 10/2016 |

OTHER PUBLICATIONS

PLCOPEN, "Technical Specification PLCopen—Technical Committee 2—Task Force, Function blocks for motion control (Formerly Part 1 and Part 2)," PLCopen Working Draft, Version 1.99—Release for comments—till Aug. 16, 2010, Version 2.0, Mar. 2011, pp. 1-141.

(Continued)

*Primary Examiner* — Michael D Masinick
(74) *Attorney, Agent, or Firm* — JCIPRNET

(57) ABSTRACT

Setting related to a motor is required to be simplified. An information processing device for performing setting related to a motor includes a generation unit which generates a plurality of pieces of motor information for designating each of a plurality of motors for driving the same control target on the basis of reception of a predetermined user operation, and an assignment unit which assigns each of the generated plurality of pieces of motor information to any one of a plurality of axes defining a predetermined coordinate system.

4 Claims, 20 Drawing Sheets

(56) References Cited

U.S. PATENT DOCUMENTS

2016/0239009 A1* 8/2016 Mizuno .................. H02P 25/06
2018/0284722 A1* 10/2018 Maruno ............... G05B 19/409

OTHER PUBLICATIONS

"Logix5000(TM) Motion Modules," Allen-Bradley, Publication 1756-UM006G-EN-P, May 1, 2005, pp. 1-559.
"Search Report of Europe Counterpart Application", dated Sep. 6, 2018, p. 1-p. 10.

* cited by examiner

Top panel (500(200))

Please set positioning axis configuration motor and positioning axis assignment for logical motor.

| | | Positioning axis logical motor number | Positioning axis configuration motor | Assign positioning axis | |
|---|---|---|---|---|---|
| | | CNCMotorP0 | CNC_Motor000(0) ▼ | X axis | ▼ |
| | | CNCMotorP1 | CNC_Motor001(1) ▼ | Y axis | ▼ |
| | | CNCMotorP2 | CNC_Motor002(2) ▼ | Z axis | ▼ |

Dropdown (559):
- CNC_Motor002(2)
- CNC_Motor003(3)
- CNC_Motor004(4)
- CNC_Motor005(5)
- <No assignment>

Press button below to create CNC configuration motor of <No assignment> -tioning axis- Configuration motor creation/ass...

Motor for spindle shaft [ <No assignment> ▼ ]

552, 553

⬇

Middle panel (500(200))

Please set positioning axis configuration motor and positioning axis assignment for logical motor.

Dialog (580):
Selected CNC motor has been set to motor for spindle shaft and other positioning axis configuration motors. Do you want to change assignment?
Press "OK" to continue assignment and clear currently assigned information.   581—[ OK ]   [ CANCEL ]—582

Motor for spindle shaft [ <No assignment> ▼ ]

⬇

Bottom panel (500(200))

Please set positioning axis configuration motor and positioning axis assignment for logical motor.

| | | Positioning axis logical motor number | Positioning axis configuration motor | Assign positioning axis | |
|---|---|---|---|---|---|
| | | CNCMotorP0 | CNC_Motor000(0) ▼ | X axis | ▼ |
| | | CNCMotorP1 | CNC_Motor001(1) ▼ | Y axis | ▼ |
| | | CNCMotorP2 | CNC_Motor005(5) ▼ | Z axis | ▼ |

Press button below to create CNC motor and assign positioning axis configuration motor of <No assignment>.

[ Configuration motor creation/assignment ]

Motor for spindle shaft [ <No assignment> ▼ ]

INFORMATION PROCESSING DEVICE, INFORMATION PROCESSING METHOD, AND RECORDING MEDIUM

CROSS-REFERENCE TO RELATED APPLICATION

This application claims the priority benefit of Japanese application serial no. 2017-065968, filed on Mar. 29, 2017. The entirety of the above-mentioned patent application is hereby incorporated by reference herein and made a part of this specification.

BACKGROUND

Technical Field

The disclosure relates to an information processing device, an information processing method, and an recording medium for performing setting related to a motor.

Related Art

Machine tools which can process workpieces having complicated shapes are widespread. Machine tools operate on the basis of numerical control (NC) programs designed by users. Control executed by an NC program includes motion control for controlling driving of a motor. Conventionally, a plurality of motors are installed in a machine tool and a single mechanical mechanism (control target) is driven by the plurality of motors (a plurality of axes). The plurality of motors are synchronized and driven by an NC program to realize various behaviors. As such a method for managing a plurality of motors, it is proposed to define an "axis group" as a unit for performing coordinate transformation or state management (see Technical Specification PLCopen—Technical Committee 2—Task Force, Function blocks for motion control (Formerly Part 1 and Part 2), PLCopen Working Draft, Version 1.99—Release for comments—till Aug. 16, 2010).

Before designing an NC program, a designer needs to preset motor information (hereinafter referred to as a "logical motor") for uniquely identifying each motor in the NC program and register a coordinate system with respect to each logical motor. The coordinate system is registered by assigning axes (e.g., an X axis, a Y axis, a Z axis, etc.) to each logical motor. Subsequently, the designer designs the NC program using the generated logical motors. Since the coordinate system is registered, the designer can designate the position and the like of each logical motor in the coordinate system and designate the position and the like of an object belonging to the coordinate system.

In this manner, the designer needs to perform setting of logical motors or registration of a coordinate system with respect to the logical motors, and the like before designing the NC program. Simplification of such setting related to motors is required.

SUMMARY

According to an aspect, an information processing device for performing setting related to a motor includes: a generation unit which generates a plurality of pieces of motor information for designating each of a plurality of motors for driving the same control target on the basis of reception of a predetermined user operation; and an assignment unit which assigns each of the generated plurality of pieces of motor information to any one of a plurality of axes defining a predetermined coordinate system.

According to another aspect, an information processing method for performing setting related to a motor includes: a step of generating a plurality of pieces of motor information for designating each of a plurality of motors for driving the same control target on the basis of reception of a predetermined user operation; and a step of assigning each of the generated plurality of pieces of motor information to any one of a plurality of axes defining a predetermined coordinate system.

According to another aspect, a non-transitory recording medium storing an information processing program for performing setting related to a motor causes an information processing device to execute: a step of generating a plurality of pieces of motor information for designating each of a plurality of motors for driving the same control target on the basis of reception of a predetermined user operation; and a step of assigning each of the generated plurality of pieces of motor information to any one of a plurality of axes defining a predetermined coordinate system.

BRIEF DESCRIPTION OF THE DRAWINGS

FIG. 11 is a diagram illustrating, in a time series, a change in the type of a logical motor.

DESCRIPTION OF THE EMBODIMENTS

Preferably, the information processing device further includes a providing unit which provides a user interface through which setting related to the generated plurality of pieces of motor information is received. The user interface is configured to receive setting of the number of motors. The generation unit generates as many pieces of motor information as the set number of motors on the basis of reception of the predetermined user operation.

Preferably, the user interface displays the generated plurality of pieces of motor information and displays an axis assigned to each piece of motor information in parallel with each piece of motor information.

Preferably, the user interface is configured to designate an axis assigned to each piece of motor information in a predetermined first candidate group when the number of types of axes assigned to the plurality of pieces of motor information is less than a predetermined number, and is configured to set an axis that has already been assigned to each piece of motor information to a second candidate group and designate an axis assigned to each piece of motor information in the second candidate group when the number of types of axes assigned to the plurality of pieces of motor information is equal to or greater than the predetermined number.

Preferably, the generation unit generates the plurality of pieces of motor information such that the plurality of pieces of motor information do not overlap.

In an aspect, setting of motors can be simplified.

Hereinafter, embodiments according to the disclosure will be described with reference to the drawings. In the following description, the same signs are attached to the same parts and components, and these parts and components also have the same names and functions. Accordingly, detailed description thereof is not repeated.

A. Configuration Example of Control System

Figure 1:
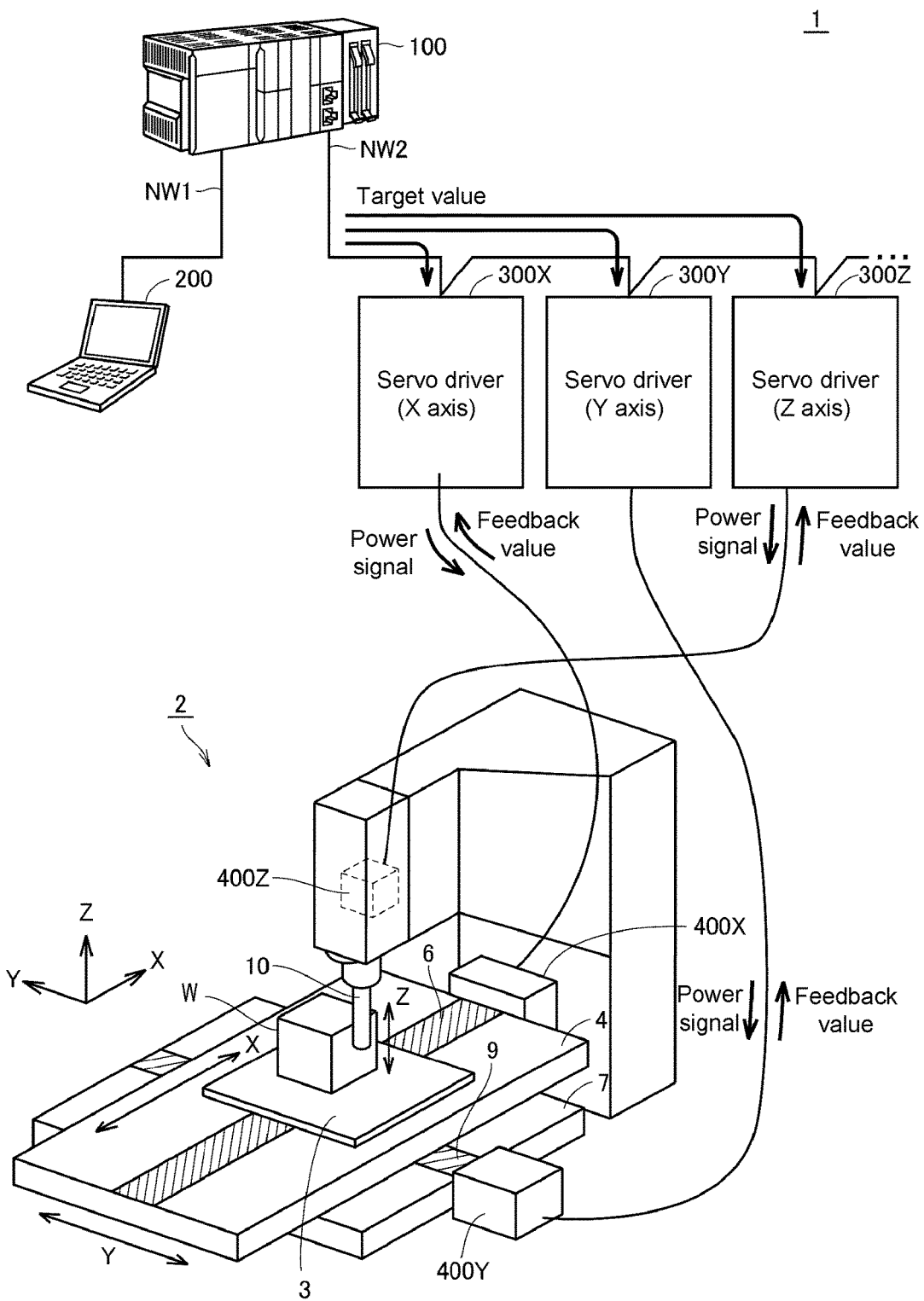
FIG. 1 is a schematic diagram illustrating a configuration example of a control system according to embodiments.

First, a configuration example of a control system 1 according to the present embodiment will be described. FIG. 1 is a schematic diagram illustrating a configuration example of the control system 1 according to the present embodiment. FIG. 1 shows an example in which a machine tool 2 is driven as a control target of the control system 1.

The control system 1 includes a controller 100 such as a programmable logic controller (PLC), an information processing device 200, and one or more servo drivers. In the configuration illustrated in FIG. 1, three servo drivers 300X, 300Y and 300Z (hereinafter also collectively referred to as a "servo driver 300") are connected to the controller 100. The servo driver 300 drives a servo motor corresponding thereto.

The information processing device 200 is connected to the controller 100 via a field network NW1. For example, EtherNET (registered trademark) is employed as the field network NW1. However, the field network NW1 is not limited to EtherNET and may employ any communication means. For example, the controller 100 may be directly connected to the information processing device 200 through a signal line. The information processing device 200 provides an environment in which an NC program for controlling the machine tool 2 is designed. An NC program designed through the information processing device 200 is transmitted to the controller 100 via the field network NW1.

The controller 100 controls the control target including servo motors by assigning a target value to each of the one or more servo drivers 300 according to the designed NC program. Data including target values can be exchanged between the controller 110 and the one or more servo drivers 300.

The one or more servo drivers 300 are connected to the controller 100. The controller 100 and the servo drivers 300 are connected through a daisy chain via a field network NW2. For example, EtherCAT (registered trademark) is employed as the field network NW2. However, the field network NW2 is not limited to EtherCAT and may employ any communication means. As an example, the controller 100 may be directly connected to the servo driver 300 through a signal line. In addition, the controller 100 and the servo driver 300 may be integrated.

The machine tool 2 is a mechanism which can move a working plate 3 on which a workpiece W is mounted in X and Y directions perpendicular to each other and move a main shaft 10 in the Z direction.

More specifically, a ball screw 6 for arbitrarily moving the working plate 3 in the X direction is provided on a first base plate 4. The ball screw 6 is engaged with a nut included in the working plate 3. Since a servo motor 400X coupled to one end of the ball screw 6 is rotationally driven, the nut included in the working plate 3 and the ball screw 6 rotate relative to each other, and thus the working plate 3 moves in the X direction.

Furthermore, a ball screw 9 for arbitrarily moving the working plate 3 and the first base plate 4 in the Y direction is provided on a second base plate 7. The ball screw 9 is engaged with a nut included in the first base plate 4. Since a servo motor 400Y coupled to one end of the ball screw 9 is rotationally driven, the nut included in the first base plate 4 and the ball screw 9 rotate relative to each other, and thus the working plate 3 and the first base plate 4 move in the Y direction.

Further, the main shaft 10 is coupled to a servo motor 400Z. Since the servo motor 400Z is rotationally driven, the main shaft 10 moves in the vertical direction (Z direction).

The controller 100 assigns a target position in the X direction as a target value for the servo driver 300X, assigns a target position in the Y direction as a target value for the servo driver 300Y and assigns a target position in the Z direction as a target value for the servo driver 300Z according to a previously designated target trajectory. The machine tool 2 can control a relative positional relationship between the workpiece W and the main shaft 10 and process the workpiece W into an arbitrary shape as the target positions in the X, Y and Z directions are sequentially updated.

The servo driver 300 includes a controller 302 for executing operations related to a later-described control loop and a drive circuit 304 which provides a power signal to the servo motor 400 on the basis of an operation result of the controller 302. As will be described later, the servo driver 300 is configured to receive a feedback value indicating a state (i.e., a controlled variable such as position) of the machine tool 2.

In the present embodiment, a configuration example in which an output signal from an encoder combined with a rotation shaft of the servo motor 400 is set to a feedback value is exemplified. The position, rotation phase, rotation speed, cumulative number of revolutions, and the like of the servo motor 400 can be detected according to the output signal from the encoder. Meanwhile, the feedback value from the servo motor 400 may be directly input to the controller 100.

B. User Interface for Generating Logical Motors

The information processing device 200 provides an environment in which an NC program for controlling the machine tool 2 is designed. Before designing the NC program, a designer needs to previously generate motor information (i.e., logical motor) for uniquely identifying each servo motor 400 in the NC program and register a coordinate system with respect to each logical motor. The coordinate system is registered by assigning an axis (e.g., an X axis, a Y axis, a Z axis or the like) to each logical motor. Subsequently, the designer can design the NC program using the generated logical motors. The designer may designate the position and the like of each logical motor in the registered coordinate system and designate the position and the like of an object belonging to the coordinate system.

Figure 2:
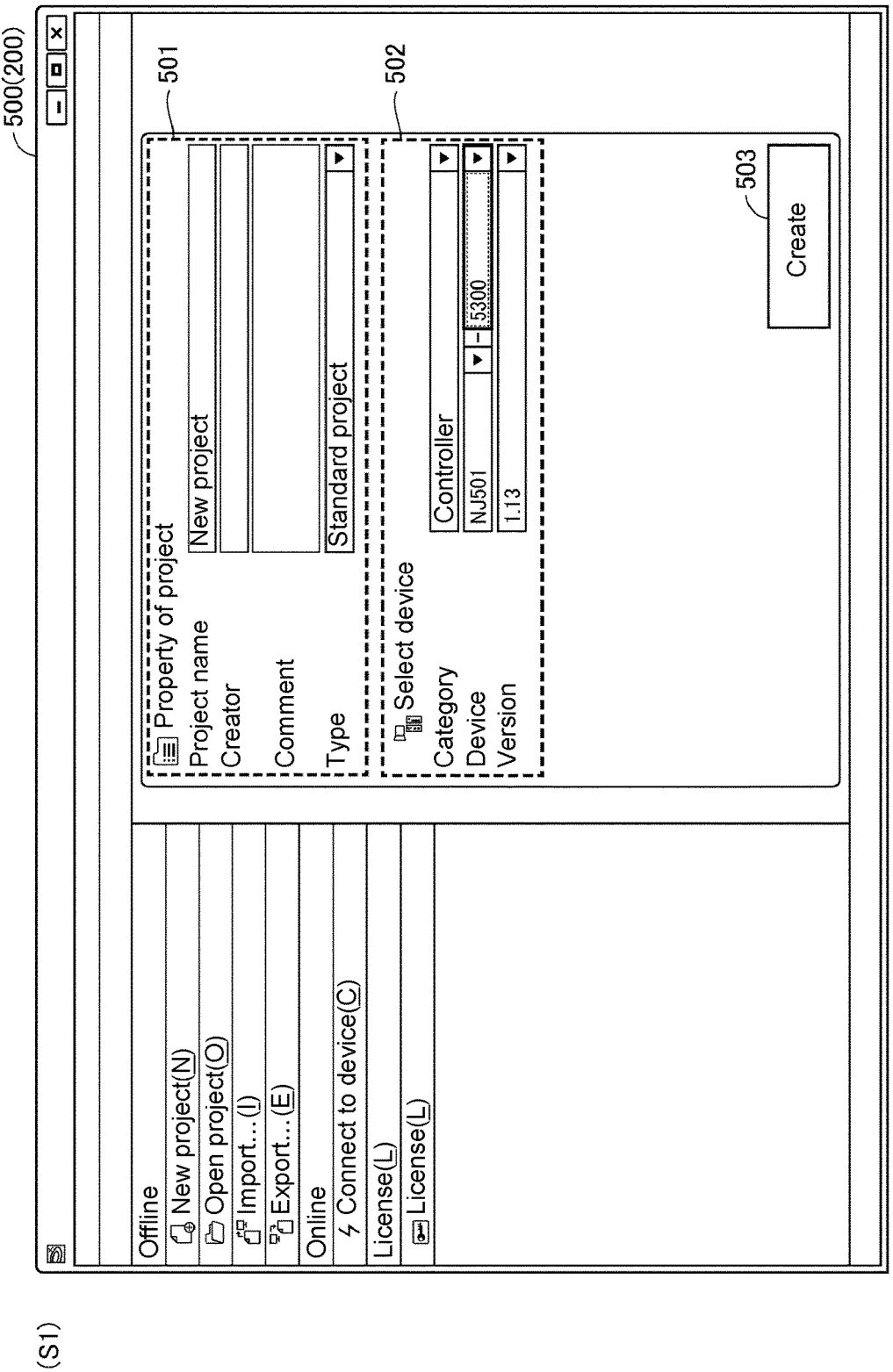
FIG. 2 is a diagram illustrating a state of a user interface in step S1.
Figure 3:
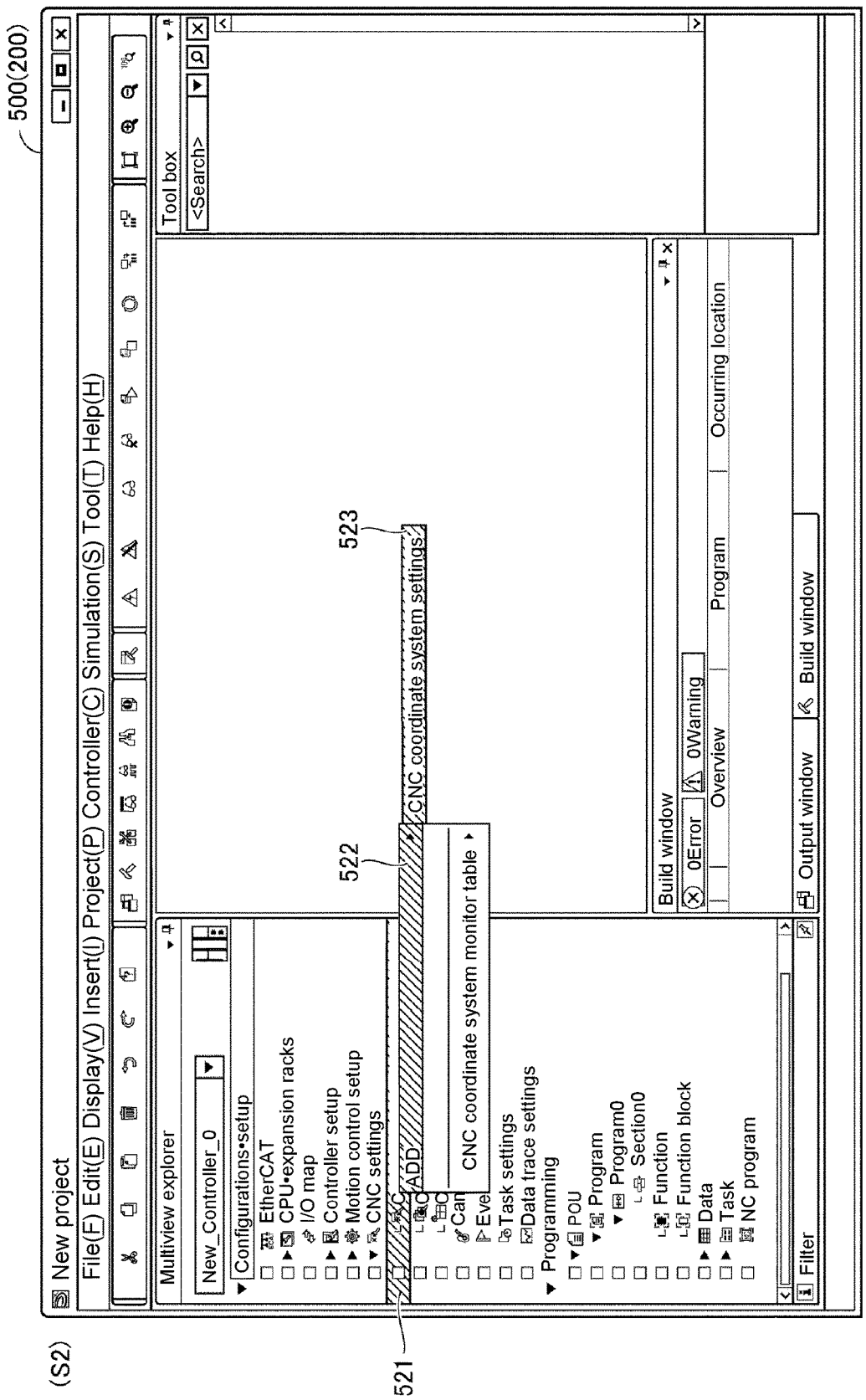
FIG. 3 is a diagram illustrating a state of the user interface in step S2.
Figure 4:
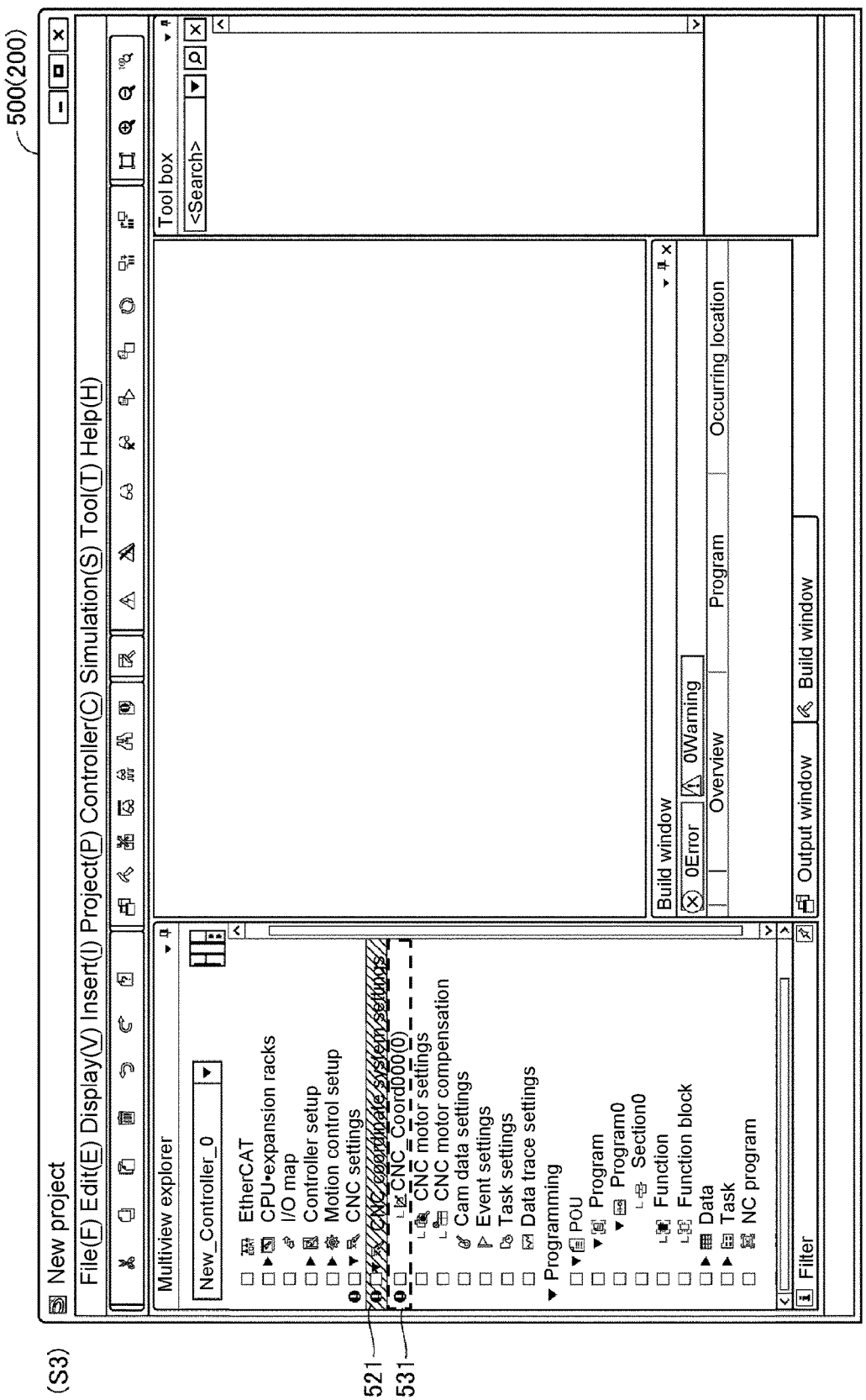
FIG. 4 is a diagram illustrating a state of the user interface in step S3.
Figure 5:
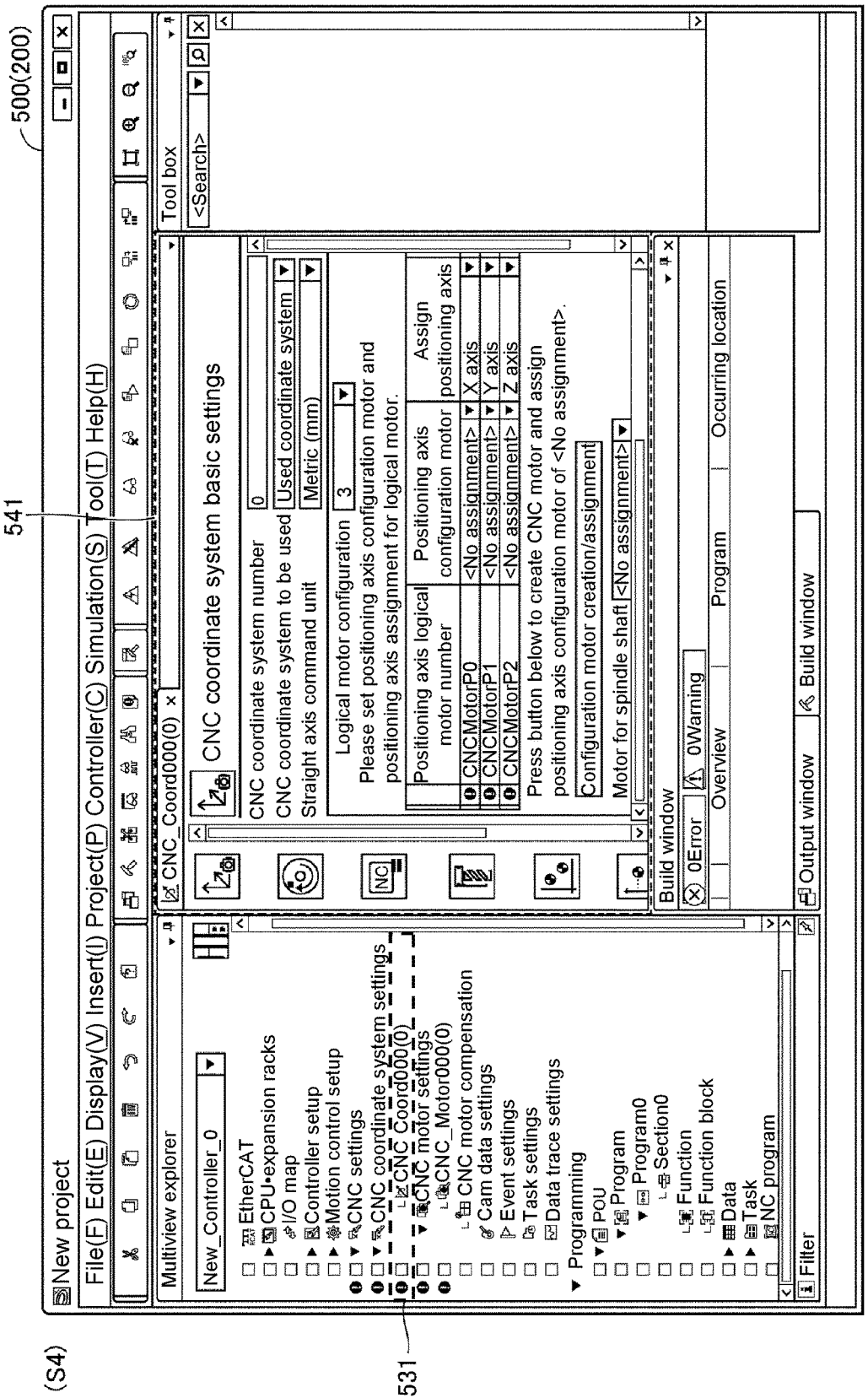
FIG. 5 is a diagram illustrating a state of the user interface in step S4.
Figure 6:
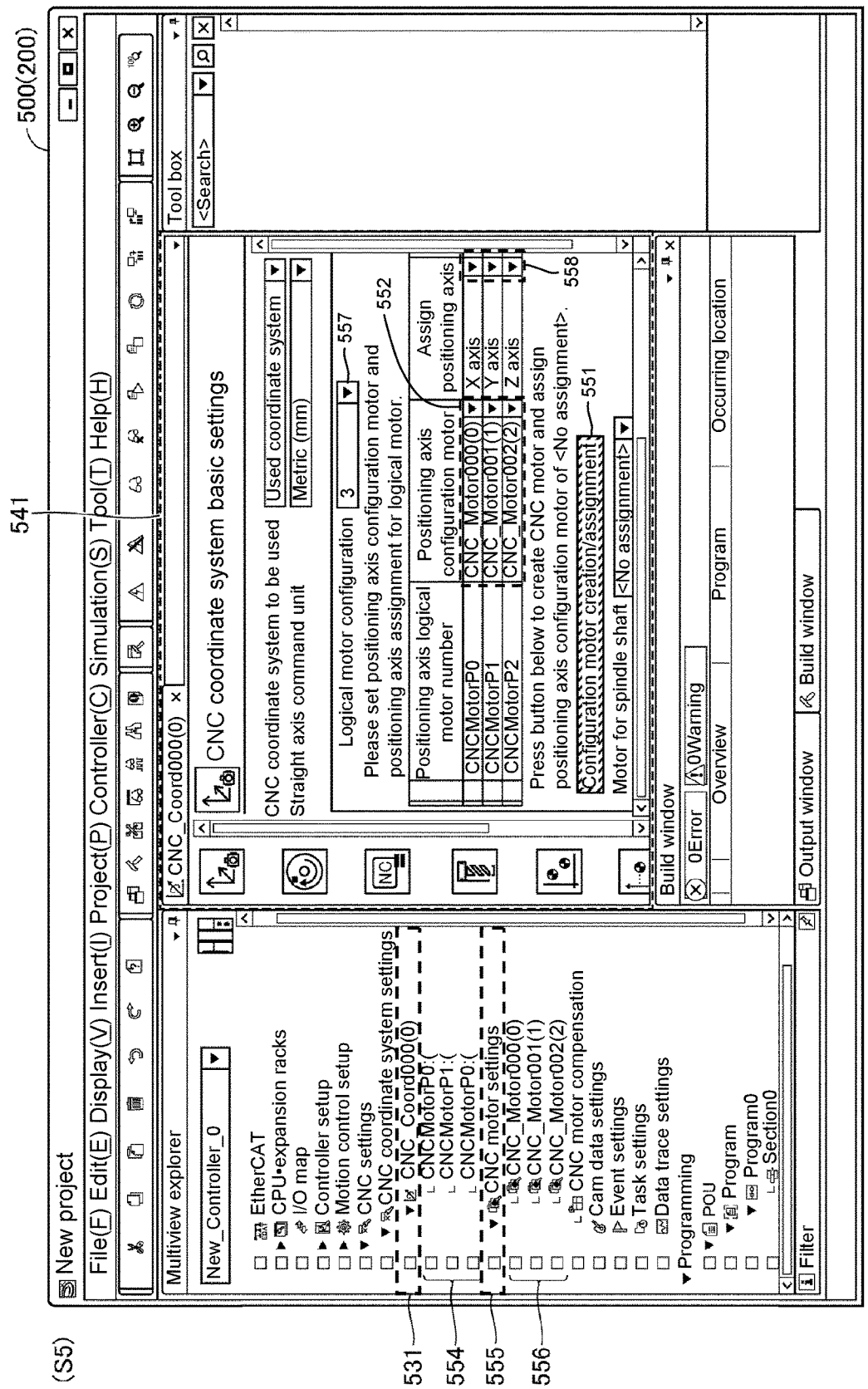
FIG. 6 is a diagram illustrating a state of the user interface in step S5.

The information processing device 200 according to the present embodiment automatically generates logical motors on the basis of reception of a predetermined user operation. Accordingly, the design efficiency of the NC program is improved. Hereinafter, a user interface 500 through which setting related to logical motors is received will be described with reference to FIGS. 2 to 6. FIG. 2 is a diagram illustrating a state of the user interface 500 in step S1. FIG. 3 is a diagram illustrating a state of the user interface 500 in step S2. FIG. 4 is a diagram illustrating a state of the user interface 500 in step S3. FIG. 5 is a diagram illustrating a state of the user interface 500 in step S4. FIG. 6 is a diagram illustrating a state of the user interface 500 in step S5.

In step S1, the user interface 500 has a project setting region 501. Setting of a project for managing the NC program being a design target is received through the project setting region 501. As an example, a project name, a program creator, a comment, a program type and the like are input to the project setting region 501.

In addition, the user interface 500 in step S1 has a controller setting region 502. Setting related to the controller 100 is received through the controller setting region 502. As an example, the type of the controller 100, the model number of the controller 100, the version of the controller 100, and the like are input to the controller setting region 502.

When a create button 503 is pressed, the information processing device 200 generates a new project according to information input to the project setting region 501 and the controller setting region 502 and causes a screen mode of the user interface 500 to transition to the state shown in FIG. 3.

In step S2, the user interface 500 displays a new project screen. When a coordinate system setting column 521 of the user interface 500 is selected through a right click or the like, an add selection item 522 is opened. When the opened add selection item 522 is selected, a coordinate system setting item 523 is further opened. When the coordinate system setting item 523 is selected, a coordinate system item 531 is added to the coordinate system setting column 521 as shown in step S3.

In step S4, it is assumed that the added coordinate system item 531 is double clicked. Accordingly, the user interface 500 displays a coordinate system setting screen 541 for registering a coordinate system. The designer can assign axes to logical motors on the coordinate system setting screen 541.

Before registering the coordinate system, the designer needs to generate logical motors in advance. As an example, it is assumed that a predetermined user operation such as an operation of pressing a generation button 551 is performed on the user interface 500 in step S5. On the basis of this operation, the information processing device 200 automatically generates logical motors 552. Each logical motor 552 corresponds to motor information for uniquely identifying a motor in the NC program. Typically, the logical motors 552 are represented as variables which can be used in the NC program, and the designer can define a behavior for a specific motor by describing a corresponding variable in the NC program.

Preferably, the user interface 500 includes a motor number setting column 557 through which the number of motors is set and generates as many logical motors as the number of motors set in the motor number setting column 557. In the example of FIG. 6, "3" is designated in the motor number setting column 557, and a logical motor "CNC_Motor000(0)," a logical motor "CNC_Motor001(1)" and a logical motor "CNC_Motor002(2)" are generated. The logical motor "CNC_Motor000(0)" is associated with a motor "CNCMotorP0." The logical motor "CNC_Motor001(1)" is associated with a motor "CNCMotor P1." The logical motor "CNC_Motor002(2)" is associated with a motor "CNCMotor P2."

Preferably, according to a predetermined generation rule, the information processing device 200 generates logical motors such that the logical motors do not overlap. As an example, the information processing device 200 differentiates names of logical motors by assigning serial numbers to the logical motors. Alternatively, the information processing device 200 may differentiate names of logical motors by assigning consecutive letters to the logical motors.

Logical motor information 554 corresponding to the logical motors 552 is added to the coordinate system item 531 on the basis of generation of the logical motors 552. Simultaneously, logical motor information 556 corresponding to the logical motors 552 is added to a motor setting item 555.

The information processing device 200 assigns each generated logical motor to any one of a plurality of axes which define a predetermined coordinate system. An axis is assigned to each logical motor to define a coordinate system. Axes assigned as initial values are arbitrarily assigned. In the example of FIG. 6, "X axis" is assigned to the logical motor "CNC_Motor000(0)" as an initial value. "Y axis" is assigned to the logical motor "CNC_Motor001(1)" as an initial value. "Z axis" is assigned to the logical motor "CNC_Motor002(2)" as an initial value.

Preferably, the user interface 500 displays the generated logical motors 552 and simultaneously displays axes assigned to the logical motors 552 in parallel with the logical motors. Accordingly, the designer can immediately recognize an axis assigned to each logical motor.

The designer may arbitrarily change the type of the axis assigned to each logical motor. Candidates for axes that can be assigned are predetermined. As an example, the candidates for axes that can be assigned include an X axis, a Y axis, a Z axis, an A axis, a B axis and a C axis. The X axis represents driving of a servo motor in the horizontal direction. The Y axis represents driving of a servo motor in a direction perpendicular to the X axis on the horizontal plane. The Z axis represents driving of a servo motor in the vertical direction perpendicular to the XY plane. The A axis represents driving of a servo motor in a rotation direction of the X axis. The B axis represents driving of a servo motor in a rotation direction of the Y axis. The C axis represents driving of a servo motor in a rotation direction of the Z axis. When an open button 558 is pressed, the candidates for axes that can be assigned are opened, and the designer can select any one of the opened candidates to change the axis assigned to each logical motor.

As described above, the designer performs generation of logical motors and assignment of an axis to each logical motor. The information processing device 200 has the function of automatically generating logical motors according to the number of motors set in the motor number setting column 557, and thus setting related to motors is simplified and man-hours for designing the NC program are reduced.

C. Comparative Example

Figure 7:
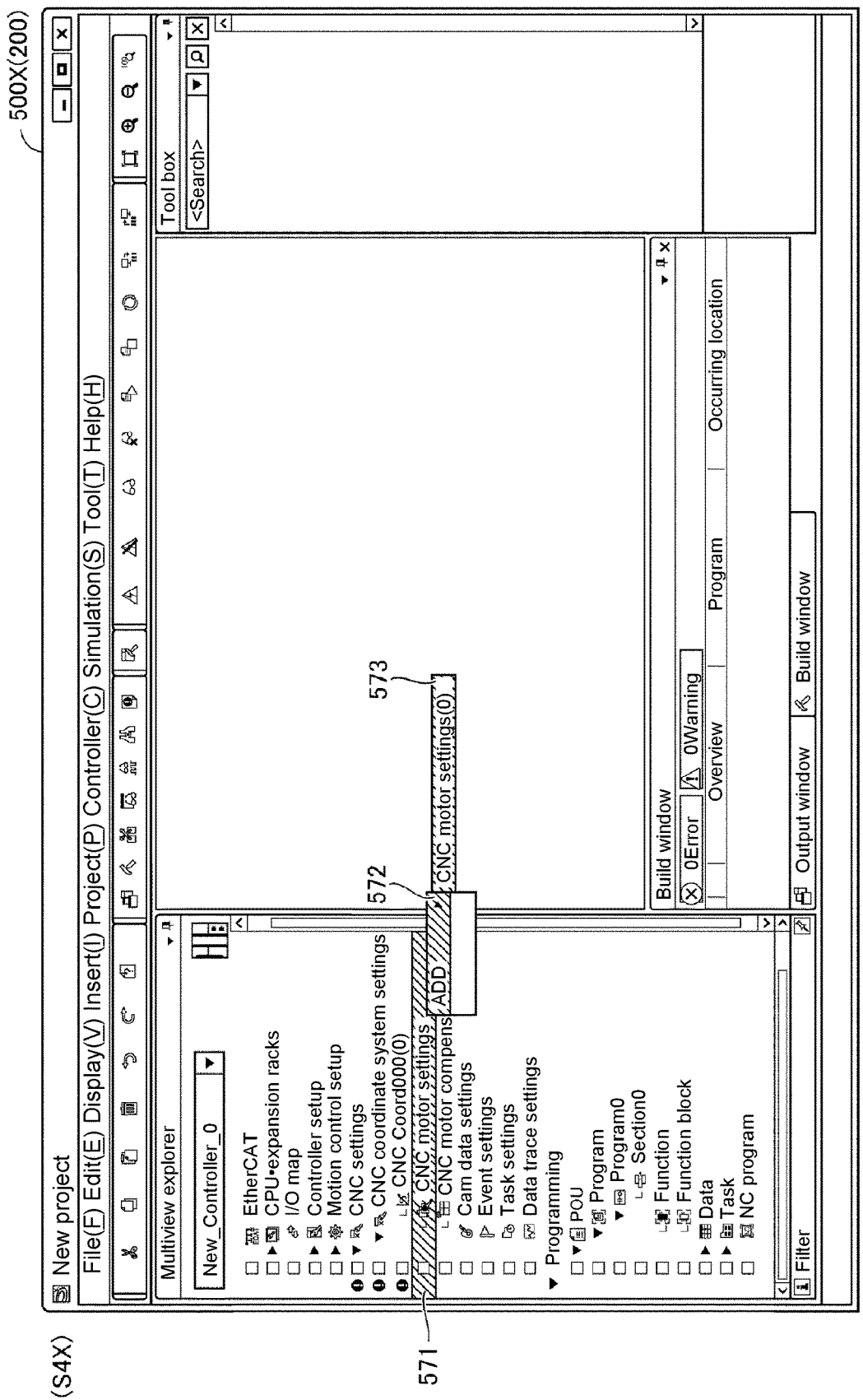
FIG. 7 is a diagram illustrating a state of the user interface in step S4X.
Figure 8:
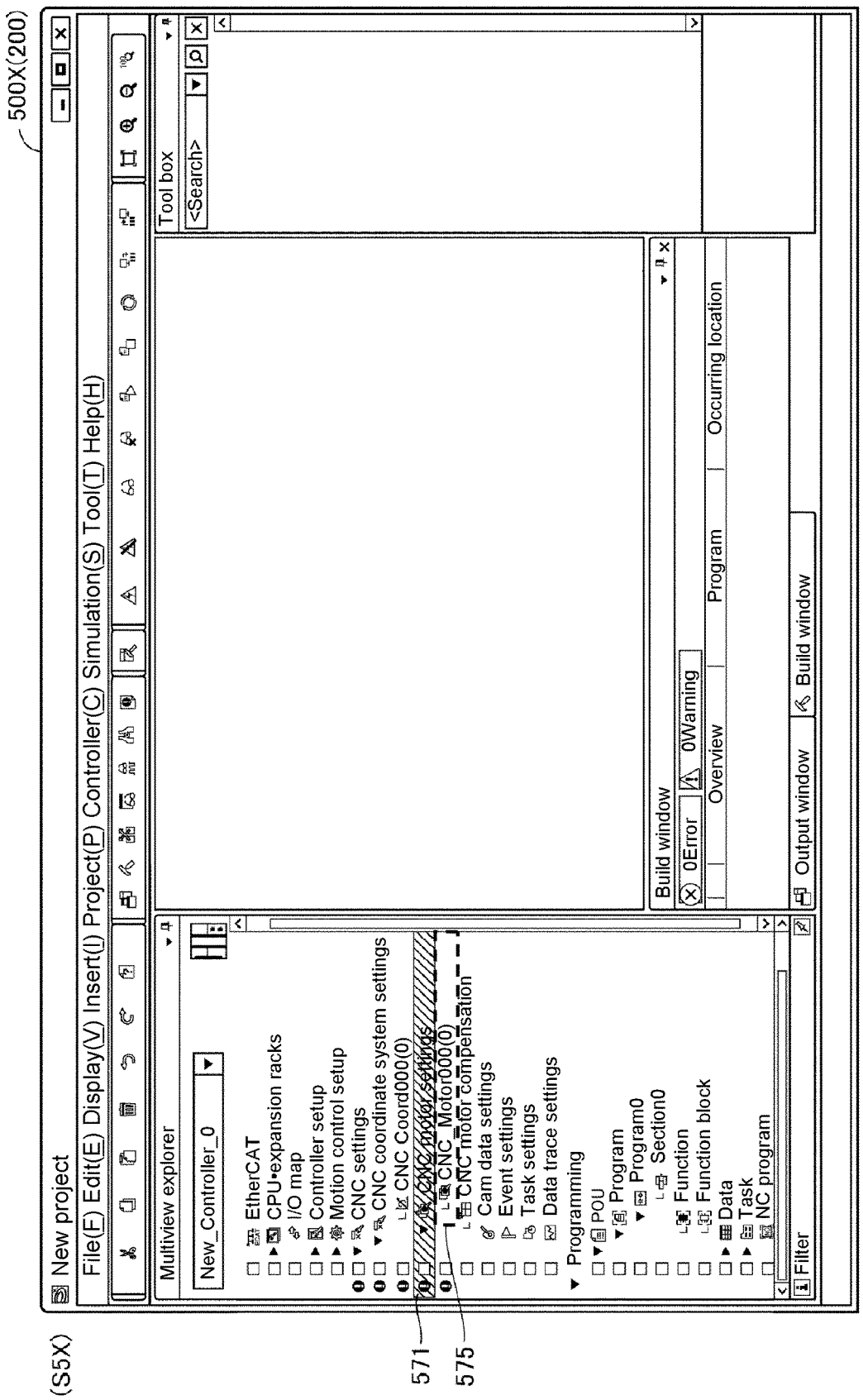
FIG. 8 is a diagram illustrating a state of the user interface in step SSX.
Figure 9:
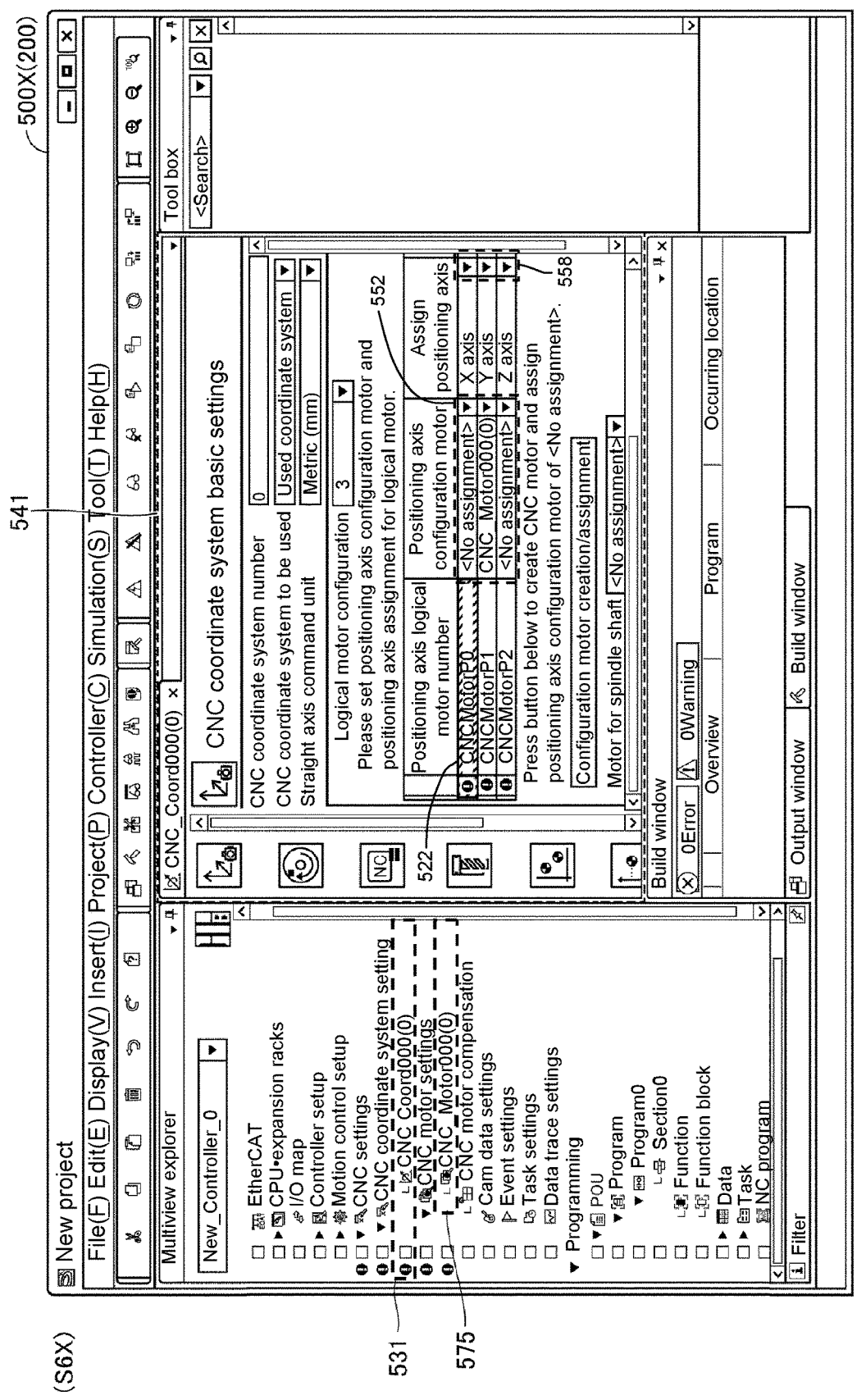
FIG. 9 is a diagram illustrating a state of the user interface in step S6X.
Figure 10:
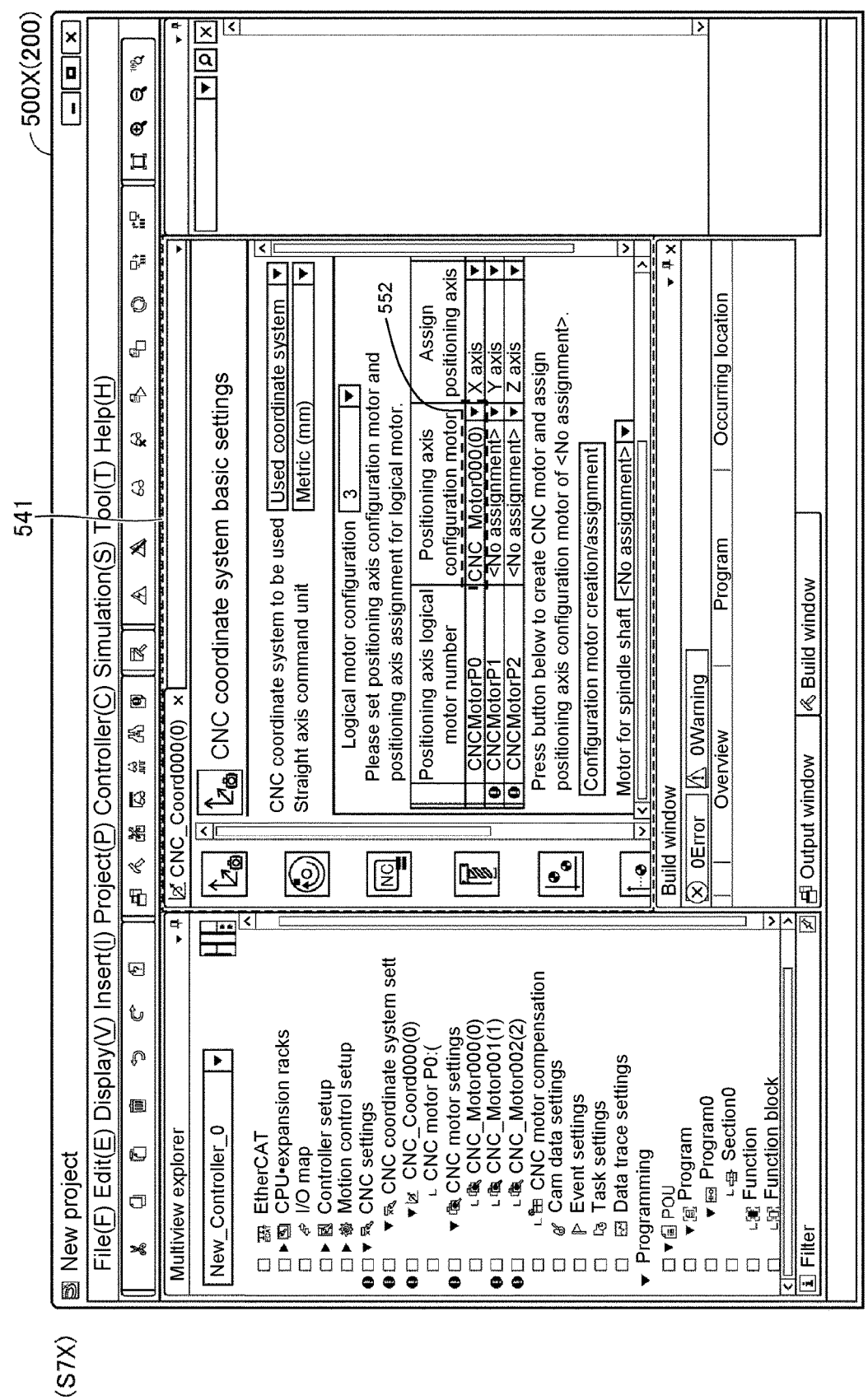
FIG. 10 is a diagram illustrating a state of the user interface in step S7X.

To explain the meaning of the function of automatically generating logical motors, a design procedure when the function of automatically generating logical motors is not used will be described with reference to FIGS. 7 to 10. FIG. 7 is a diagram illustrating a state of the user interface 500X in step S4X. FIG. 8 is a diagram illustrating a state of the user interface 500X in step S5X. FIG. 9 is a diagram illustrating a state of the user interface 500X in step S6X. FIG. 10 is a diagram illustrating a state of the user interface 500X in step S7X.

The screen of the user interface 500X in step S4X illustrated in FIG. 7 is a continuation of the screen displayed in the above-described step S3 (refer to FIG. 4). In step S4X, it is assumed that a motor setting column 571 on the user interface 500X is selected through a right click or the like. Accordingly, an add selection item 572 is opened. When the opened add selection item 572 is selected, a motor setting item 573 is further opened. When the motor setting item 573 is selected, the information processing device 200 newly adds a logical motor 575 to the motor setting column 571 as illustrated in step S5X.

In step S6X, it is assumed that the added coordinate system item 531 is doubled clicked. On the basis of this operation, the user interface 500 displays the coordinate system setting screen 541. When the open button 553 is pressed, "CNC_Motor000(0)" corresponding to the added logical motor 575 is opened as an option of a logical motor.

In step S7X, it is assumed that the opened logical motor "CNC_Motor000(0)" is selected. Accordingly, the logical motor "CNC_Motor000(0)" is associated with the servo motor "CNCMotorP0."

The designer repeats the operations shown in steps S4X to S7X for each motor in the machine tool 2. In this manner, the designer needs to repeat addition and selection of a logical motor when the function of automatically generating logical motors is not used. When the function of automatically generating logical motors is used, such efforts are omitted and thus man-hours for designing the NC program are reduced.

D. Operation of Changing Logical Motors

An operation of changing logical motors on the user interface 500 will be described with reference to FIG. 11. FIG. 11 is a diagram illustrating, in time series, a change in the type of a logical motor. The user interface 500 illustrated in FIG. 11 corresponds to a portion of the user interface 500 illustrated in FIG. 6.

The user interface 500 is configured to be able to change types of the logical motors 552. As an example, the open buttons 553 are provided for the logical motors 552, and options of logical motors are opened by pressing the open buttons 553. In the example of FIG. 11, the open button 553 of the servo motor "CNCMotorP2" is pressed and thus options 559 are displayed as candidates for logical motors. The designer can associate the logical motor "CNC_Motor002(2)" with the servo motor "CNCMotorP2" by selecting a specific logical motor from the options 559. In the example of FIG. 11, the logical motor "CNC_Motor002(2)" associated with the servo motor "CNCMotorP2" is changed to a logical motor "CNC_Motor005(5)."

Preferably, the information processing device 200 does not include logical motors belonging to the coordinate system of the current setting target in the options 559. That is, the logical motors "CNC_Motor000(0)" and "CNC_Motor001(1)" are not included in the options 559 in the example of FIG. 11.

When a logical motor is newly selected from the options 559, the information processing device 200 determines whether the selected logical motor has already been assigned to another coordinate system different from the coordinate system of the current setting target. When it is determined that the selected logical motor has already been assigned to another coordinate system, the user interface 500 displays a warning 580 indicating the determination result. When an OK button 581 on the warning 580 is pressed, the information processing device 200 deletes the selected logical motor from the other coordinate system. When a cancel button 582 is pressed, the information processing device 200 closes the warning 580 in a state in which the current setting is maintained.

In the example of FIG. 11, it is assumed that the OK button 581 is pressed. Accordingly, the logical motor "CNC_ Motor005(5)" assigned to the other coordinate system is assigned to the coordinate system of the current setting target.

E. Operation of Changing Number of Logical Motors

Figure 12:
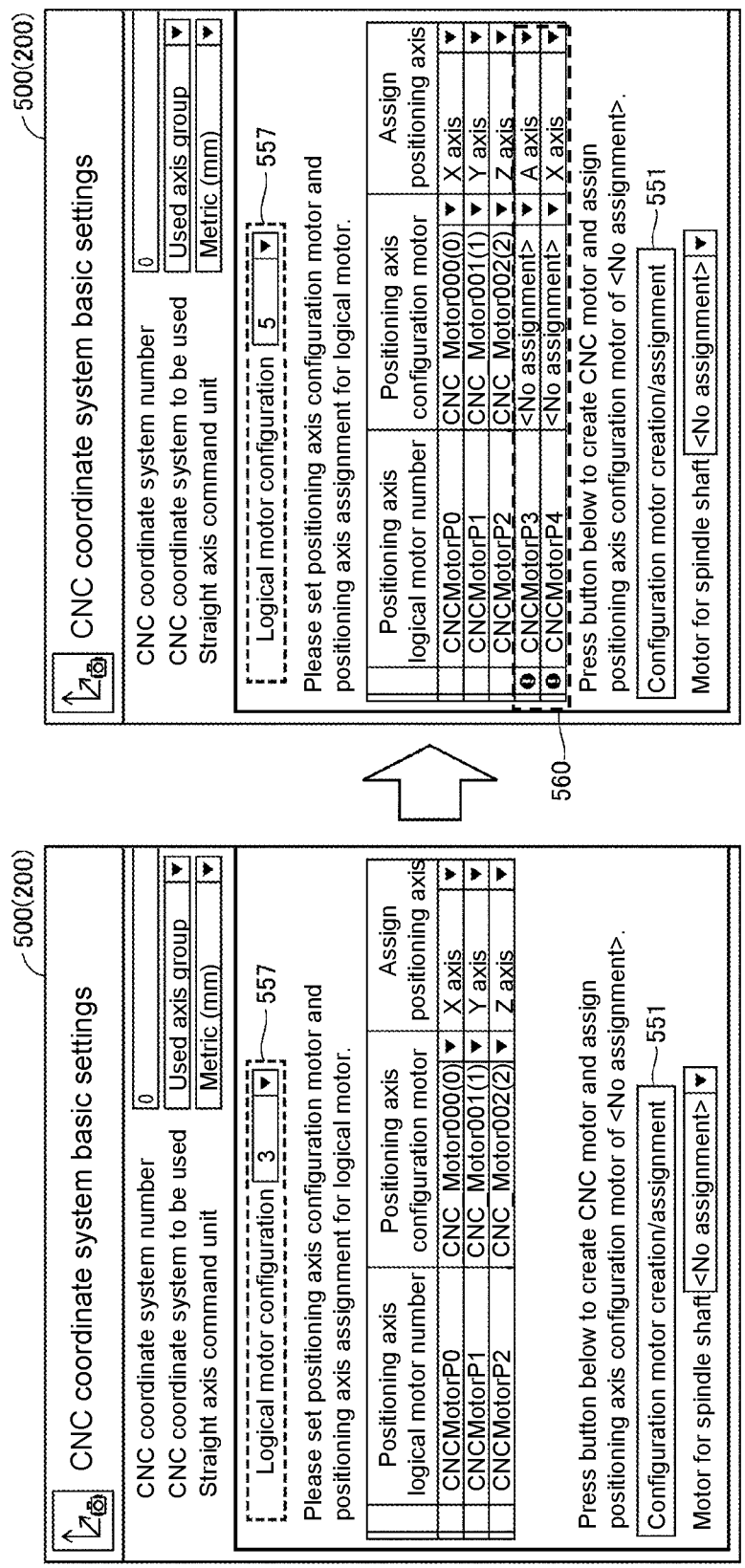
FIG. 12 is a diagram illustrating, in a time series, changing of the number of logical motors.

An operation of changing the number of logical motors will be described with reference to FIG. 12. FIG. 12 is a diagram illustrating, in a time series, changing of the number of logical motors. The user interface 500 illustrated in FIG. 12 corresponds to a portion of the user interface 500 illustrated in FIG. 6.

As described above, the user interface 500 has the motor number setting column 557 in which setting of the number of motors is received. When the number of motors in the motor number setting column 557 is changed, the user interface 500 adds/deletes a logical motor setting column depending on the changed number of motors. In the example of FIG. 12, the number of motors in the motor number setting column 557 is changed from "3" to "5". On the basis of this operation, two logical motor setting columns 560 are added.

As an example, a logical motor is not assigned to the setting column 560 immediately after addition of the setting column 560. When the generation button 551 is pressed in a state in which the setting columns 560 have been added, logical motors corresponding to the number of added setting columns 560 are newly generated and the generated logical motors are reflected in the setting columns 560.

On the other hand, any one of a plurality of predetermined axes is assigned to the added setting columns 560 as an initial value. In the example of FIG. 12, "A axis" is assigned to the servo motor "CNCMotorP3" as an initial value. "X axis" is assigned to the servo motor "CNCMotorP4" as an initial value.

There are cases in which the maximum number of axes that can be assigned to logical motors is regulated by laws in some countries. This is because parts used for weapons and the like can be generated when assigned axes are arbitrarily set. Accordingly, new axes are preferably assigned such that the number of types of axes that have already been assigned does not exceed the maximum number of axes that can be assigned. For example, it is assumed that the maximum number of axes that can be assigned is 4 and three types of "X axis," "Y axis" and "Z axis" have already been assigned prior to addition of the setting columns 560. In this case, when "A axis" is newly assigned to one of the setting columns 560, the assigned axes become 4 types. Thereafter, an axis is assigned to the remaining one setting column 560 such that the number of types of axes is not increased. That is, any one of "X axis," "Y axis," "Z axis" and "A axis" is assigned to the remaining one setting column 560. Accordingly, the number of types of assigned axes is limited to a predetermined number and thus a design error caused by the designer is suppressed.

F. Operation of Changing Axes

Figure 13B:
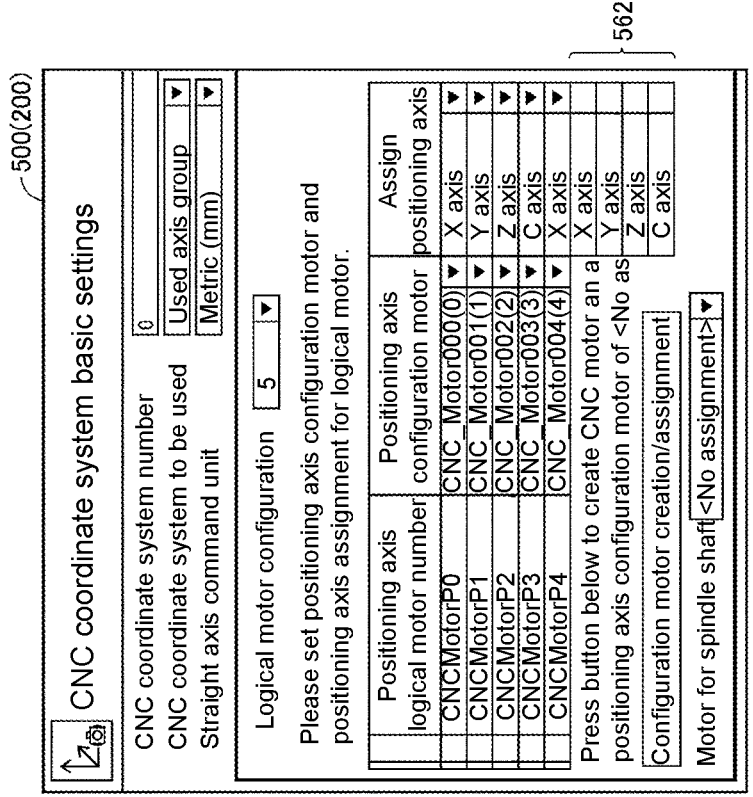
FIG. 13(A) and FIG. 13(B) are diagrams illustrating an operation of changing axes assigned to logical motors.
Figure 13A:
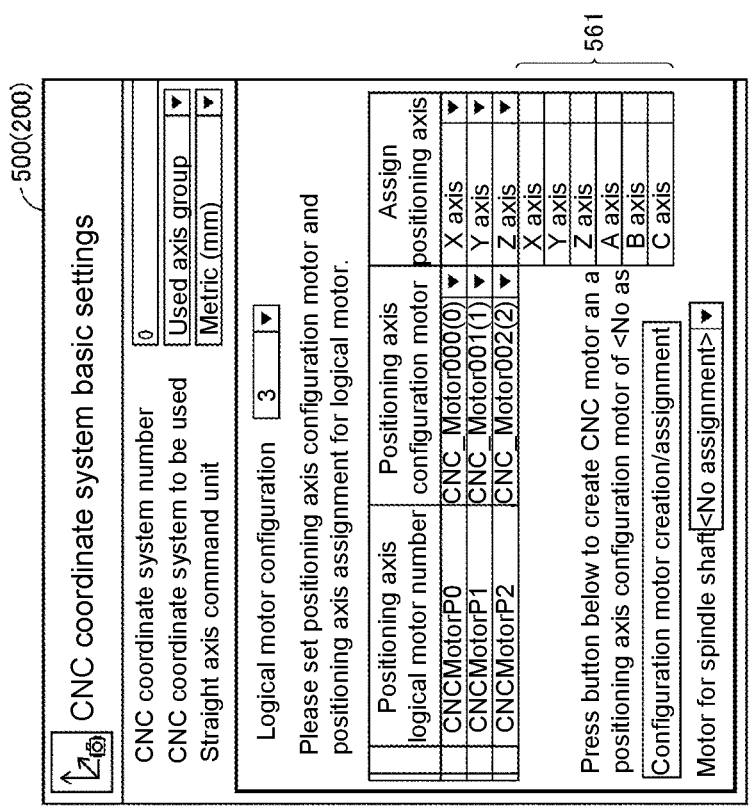

An operation of changing axes assigned to logical motors will be described with reference to FIG. 13(A) and FIG. 13(B). FIG. 13(A) and FIG. 13(B) are diagrams illustrating the operation of changing axes assigned to logical motors. The user interface 500 illustrated in FIG. 13(A) and FIG. 13(B) corresponds to a portion of the user interface 500 illustrated in FIG. 6.

As described above, there are cases in which the maximum number of axes that can be assigned is regulated by laws in some countries. Accordingly, the user interface 500 adjusts types of selectable axes depending on the number of types of axes that have already been assigned to logical motors.

More specifically, when the number of types of axes that have already been assigned to logical motors is less than a predetermined number, the user interface 500 is configured to be able to designate an axis assigned to each logical motor in a predetermined first candidate group. On the other hand, when the number of types of axes that have already been assigned to logical motors is equal to or greater than the predetermined number, the user interface 500 is configured to set the assigned axes as a second candidate group and to be able to designate an axis assigned to each logical motor in the second candidate group.

For example, it is assumed that the maximum number of axes that can be assigned is set to 4. In this case, it is assumed that three types of axes namely, "X axis," "Y axis" and "Z axis," have already been assigned to logical motors as illustrated in FIG. 13(A). In this case, all predetermined axes (i.e., the X axis, the Y axis, the Z axis, the A axis, the B axis and the C axis) are determined as the first candidate group 561 and the designer can designate an axis assigned to each logical motor in the first candidate group 561.

As another example, it is assumed that four types of axes, namely, "X axis," "Y axis," "Z axis" and "C axis," have already been assigned to logical motors as illustrated in FIG. 13(B). In this case, the types of axes that have already been assigned (i.e., the X axis, the Y axis, the Z axis and the C axis) are determined as the second candidate group 562 and the designer can designate an axis assigned to each logical motor in the second candidate group 562.

In this manner, types of selectable axes are limited to the second candidate group 562 from the first candidate group 561 in response to the number of types of axes that have already been assigned. That is, the number of types of axes included in the second candidate group is less than the number of types of axes included in the first candidate group 561. Accordingly, the number of types of selectable axes is maintained below a specific number and thus a design error caused by the designer is suppressed.

G. Device Configuration

Figure 14:
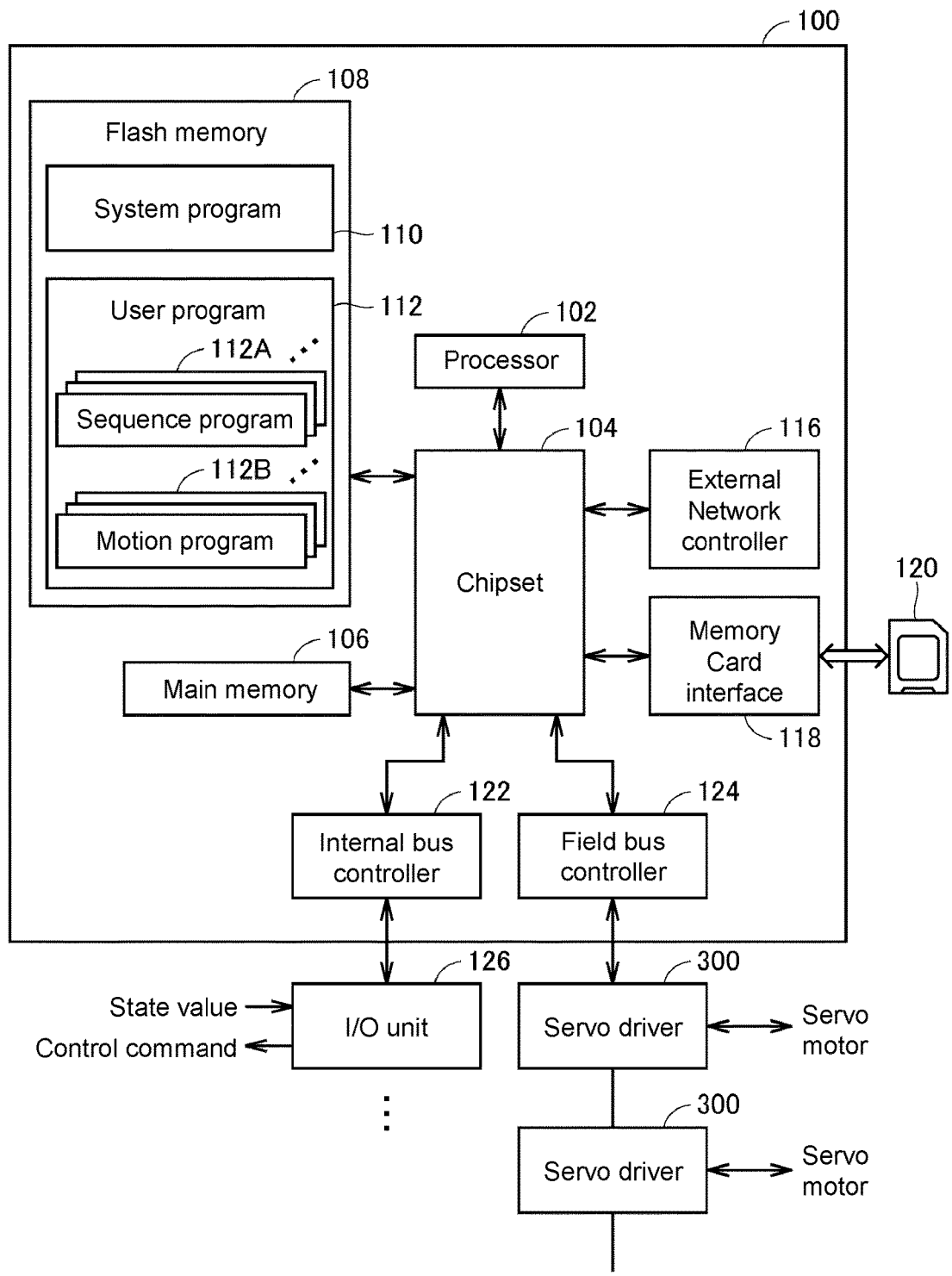
FIG. 14 is a schematic diagram illustrating an example of a hardware configuration of a controller according to embodiments.

Next, a configuration of each device constituting the control system 1 according to the present embodiment will be described with reference to FIGS. 14 to 16.

(g1. Controller 100)

First, a hardware configuration of the controller 100 constituting the control system 1 will be described with reference to FIG. 14. FIG. 14 is a schematic diagram illustrating an example of the hardware configuration of the controller 100.

The controller 100 includes a processor 102 such as a central processing unit (CPU) or a micro-processing unit (MPU), a chipset 104, a main memory 106, a flash memory 108, an external network controller 116, a memory card interface 118, an internal bus controller 122, and a field bus controller 124.

The processor 102 realizes any control for a control target such as the machine tool 2 by reading a system program 110 and a user program 112 stored in the flash memory 108, opening the programs in the main memory 106 and executing the programs. By executing the system program 110 and the user program 112 through the processor 102, processes related to output of a target value to a servo driver, acquisition of a feedback value from the servo driver and data communication via a field bus, as will be described later, are performed.

The system program 110 includes command code for providing basic functions of the controller 100, such as processing of input/output of data and execution timing control. The user program 112 is arbitrarily designed depending on a control target and includes sequence programs 112A for executing sequence control and motion programs 112B for executing motion control. For example, the user program 112 is an NC program.

The chipset 104 realizes processing as the entire controller 100 by controlling each component.

The internal bus controller 122 is an interface for exchanging data with various devices coupled to the controller 100 through an internal bus. As an example of such devices, an I/O unit 126 is connected.

The field bus controller 124 is an interface for exchanging data with various devices coupled to the controller 100 through a field bus. As an example of such devices, the servo driver 300 is connected.

The internal bus controller 122 and the field bus controller 124 can provide any instruction to connected devices and acquire any data (including measurement values) managed by the devices. In addition, the internal bus controller 122 and/or the field bus controller 124 serve as interfaces for exchanging data with the servo driver 300.

The external network controller 116 controls exchange of data through various wired/wireless networks. The memory card interface 118 is configured such that a memory card 120 can be attached/detached thereto/therefrom and can write data to the memory card 120 and read data from the memory card 120.

(g2. Information Processing Device 200)

Next, a hardware configuration of the information processing device 200 will be described with reference to FIG.

15. FIG. 15 is a schematic diagram illustrating an example of the hardware configuration of the information processing device 200.

The information processing device 200 may be a portable terminal such as a notebook personal computer (PC), a tablet terminal or a smartphone or may be a non-portable terminal such as a desktop PC.

The information processing device 200 includes, as main components, a processor 202 which executes control programs such as an operating system (OS) and an NC program, a memory 204 which provides a working area for storing data necessary to execute programs in the processor 202, an operation unit 206, such as a keyboard or a mouse, which receives a user operation, an output unit 208, such as a display, various indicators, or a printer, which outputs processing results, a network interface (I/F) 210 for communicating with an external network, an optical drive 212, a local communication interface (I/F) 216 for communicating with the controller 100 or the like, and an auxiliary storage device 220. These components are connected via an internal bus 218 such that data communication can be performed.

The information processing device 200 includes the optical drive 212, reads various programs from a computer readable recording medium 214 which is an optical recording medium non-transiently storing computer readable programs (e.g., digital versatile disc (DVD) or the like) and installs the read programs in the auxiliary storage device 220 or the like. A process of generating an NC program according to the present embodiment may be provided as part of a development environment program which provides functions such as setting, programming and debugging for the controller 100.

Although various programs executed in the information processing device 200 may be installed through the computer readable recording medium 214, they may be installed in a manner of being downloaded from a server device or the like on a network. In addition, there is a case in which a program related to the function of generating an NC program according to the present embodiment is realized in a manner of using some modules provided by the OS. In such a case, all software modules necessary to realize the function of generating an NC program according to the present embodiment are not distributed and only some of the software modules are distributed. It is obvious that this case is also included in the technical scope of the disclosure. Furthermore, the function of generating an NC program according to the present embodiment may be implemented as part of other programs or software.

The auxiliary storage device 220 is configured as, for example, a hard disk drive (HDD), a flash solid state drive (SSD) or the like and stores programs executed in the processor 202. Specifically, the auxiliary storage device 220 includes an information processing program 222 for providing the aforementioned user interface 500 or the like, controller information 224 which will be described later, setting information 226 which will be described later, and the like.

Figure 15:
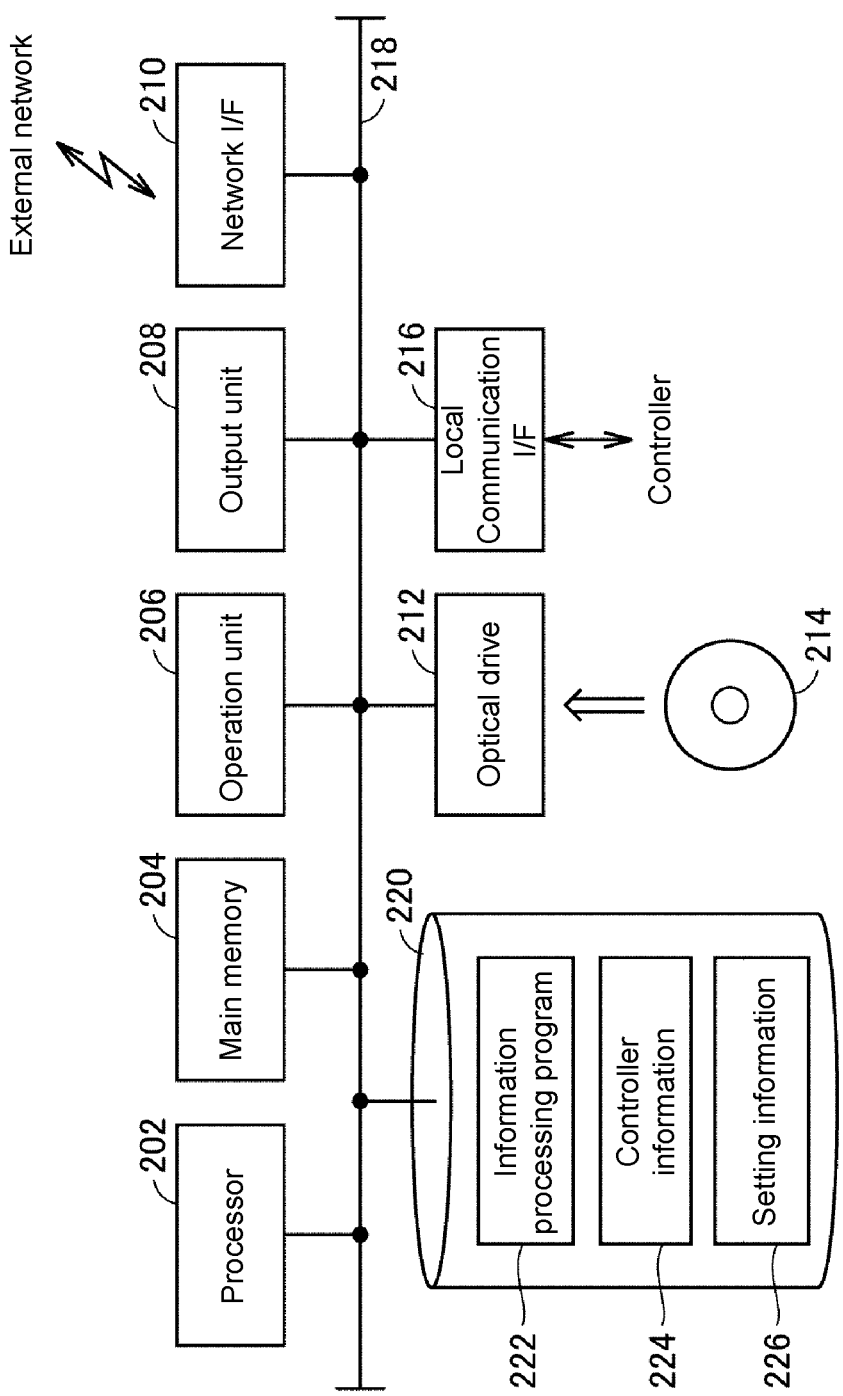
FIG. 15 is a schematic diagram illustrating an example of a hardware configuration of an information processing device according to embodiments.
Figure 16:
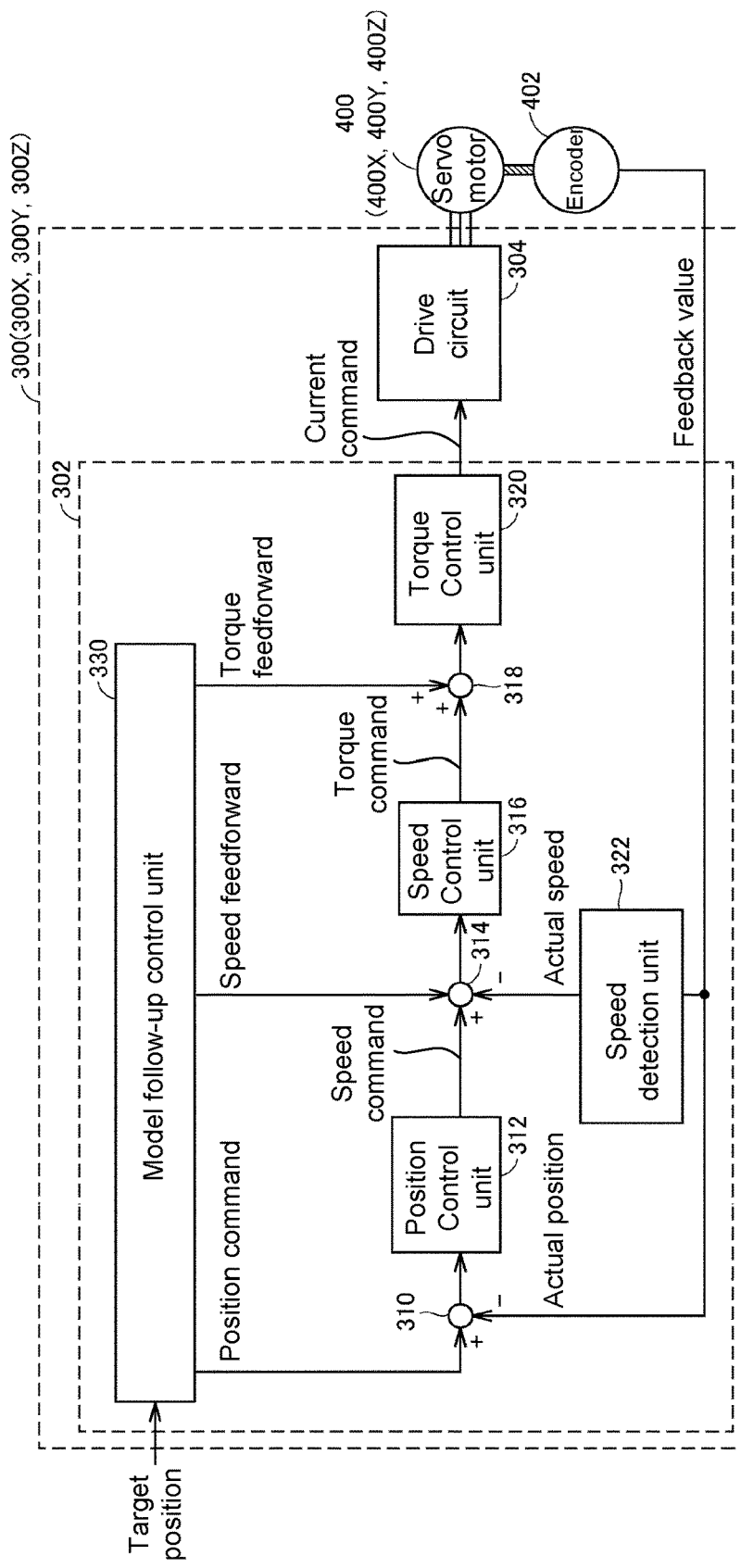
FIG. 16 is a schematic diagram illustrating an example of a functional configuration of a servo driver connected to the controller according to embodiments.

Although the function of generating an NC program according to the present embodiment is realized by executing a program through a general-purpose computer in FIG. 15, it is possible to implement all or some of the function as a hard-wired circuit instead of using such configuration. For example, functions provided by executing the above-described various programs through the processor 202 may be implemented using an application specific integrated circuit (ASIC) or a field-programmable gate array (FPGA).

(g3. Servo Driver 300)

A functional configuration of the servo driver 300 connected to the controller 100 according to the present embodiment will be described. FIG. 16 is a schematic diagram illustrating an example of the functional configuration of the servo driver 300 connected to the controller 100 according to the present embodiment.

In the control system 1 according to the present embodiment, a target position is provided as a target value to the servo driver 300 from the controller 100 and an output signal from an encoder 402 coupled to the servo motor 400 is provided as a feedback value.

The servo driver 300 included in the control system 1 according to the present embodiment adjusts a current command which is an operation amount with respect to the drive circuit 304 such that an actual position obtained by the feedback value from the encoder 402 follows the target position provided by the controller 100 or the like. As an example, in the servo driver 300 according to the present embodiment, control loops of a model follow-up control system are configured. That is, control operations according to the control loops of the model follow-up control system are executed in the servo driver 300.

Control parameters such as a control gain set in such control loops are optimized in advance depending on a control target. That is, the servo driver 300 is configured to execute a control operation of determining an operation amount for driving the servo motor 400 on the basis of control parameters determined depending on a control target. Specifically, control operations executed by the controller 302 of the servo driver 300 include a speed control loop as a minor loop in addition to a position control loop as a main loop.

More specifically, the controller 302 of the servo driver 300 includes difference calculation units 310 and 314, a position control unit 312, a speed control unit 316, an addition unit 318, a torque control unit 320, a speed detection unit 322, and a model follow-up control unit 330 as functional components.

The position control unit 312 is a control operation unit which configures a control loop with respect to a position and outputs a speed command in response to a position deviation from the difference calculation unit 310 as an operation amount. The difference calculation unit 310 calculates a deviation between a position command from the model follow-up control unit 330 and an actual position (feedback value).

The speed control unit 316 is a control operation unit which configures a control loop with respect to speed and outputs a torque command in response to a speed deviation from the difference calculation unit 314 as an operation amount. The difference calculation unit 314 calculates a deviation between the operation amount (speed command) from the position control unit 312 and an actual speed (feedback value).

The speed detection unit 322 detects an actual speed (or actual rotation speed) of the servo motor 400 from a feedback value (e.g., a number of pulses in proportion to the number of revolutions of the servo motor 400) from the encoder 402.

The torque control unit 320 is a control operation unit which configures a control loop with respect to torque and outputs a current command in response to an operation amount (torque command) from the speed detection unit 322 as an operation amount.

The drive circuit 304 adjusts the magnitude, timing, waveform and the like of a current supplied to the servo motor 400 such that the operation amount (current command) from the torque control unit 320 can be realized.

The model follow-up control unit 330 previously acquires a characteristic parameter indicating a dynamic characteristic of a control target (servo driver 300 and a load (machine) driven by the servo driver 300) according to tuning. The model follow-up control unit 330 calculates a position command corresponding to a target value in a position control loop, speed feedforward for a speed control loop, and torque feedforward for a torque control loop on the basis of the characteristic parameter for a target position provided by the controller 100 or the like.

H. Functional Configuration

Figure 17:
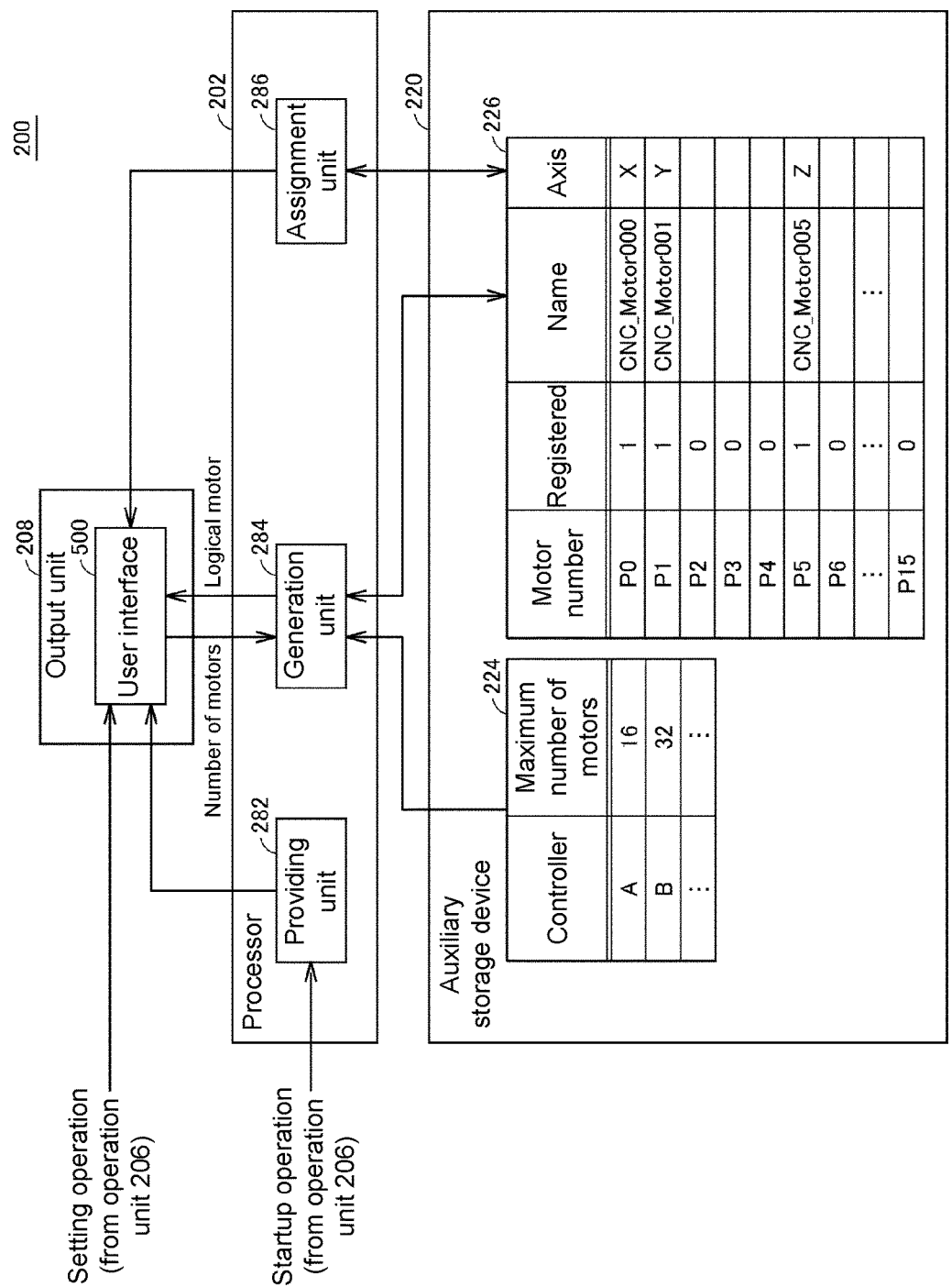
FIG. 17 is a diagram illustrating an example of a functional configuration of an information processing device according to embodiments.

Functions of the information processing device 200 will be described with reference to FIG. 17. FIG. 17 is a diagram illustrating an example of a functional configuration of the information processing device 200.

As illustrated in FIG. 17, the information processing device 200 includes the processor 202, the output unit 208 and the auxiliary storage device 220 as primary hardware components. The processor 202 includes a providing unit 282, a generation unit 284 and an assignment unit 286 as functional components. The auxiliary storage device 220 stores the controller information 224 and the setting information 226 as data.

The providing unit 282 displays the user interface 500 which is an NC program design screen on the output unit 208 on the basis of startup of an application for designing an NC program. The user interface 500 has been described in FIGS. 2 to 6 and thus description thereof is not repeated.

The generation unit 284 generates as many logical motors as the number of motors set in the motor number setting column 557 (refer to FIG. 6) of the user interface 500 on the basis of reception of a predetermined user operation. More specifically, first, the generation unit 284 acquires a maximum number of motors connectable to the controller, which is designated in the controller setting region 502 (refer to FIG. 2), with reference to the controller information 224. The controller information 224 is data which specifies a maximum number of connectable motors for each controller type. When the sum of the number of generated logical motors and the number of logical motors to be generated exceeds the maximum number of connectable motors, the generation unit 284 ends the process without generating logical motors. When the sum of the number of generated logical motors and the number of logical motors to be generated does not exceed the maximum number of connectable motors, the generation unit 284 generates as many logical motors as the number of motors set in the motor number setting column 557.

Preferably, the generation unit 284 determines names of logical motors such that the logical motors do not have the same name with reference to the setting information 226 related to the logical motors. The setting information 226 is data in which motor numbers, information indicating whether registration has been performed, logical motor names, and axes assigned to logical motors are associated with one another. The generation unit 284 excludes logical motor names that have already been specified in the setting information 226 from logical motor name candidates. Accordingly, logical motors do not have the same name. Logical motors generated by the generation unit 284 are written in the setting information 226.

The assignment unit 286 assigns each logical motor generated by the generation unit 284 to any one of a plurality of axes which define a predetermined coordinate system. Here, the assignment unit 286 assigns an axis to each logical motor such that the number of types of assigned axes does not exceed a predetermined number. For example, when the maximum number of axes that can be assigned is limited to four types, the assignment unit 286 assigns an axis to each logical motor such that the number of types of axes assigned to logical motors is within four types. An axis assigned to each logical motor is written in the setting information 226.

I. Control Structure of Information Processing Device 200

Figure 18:
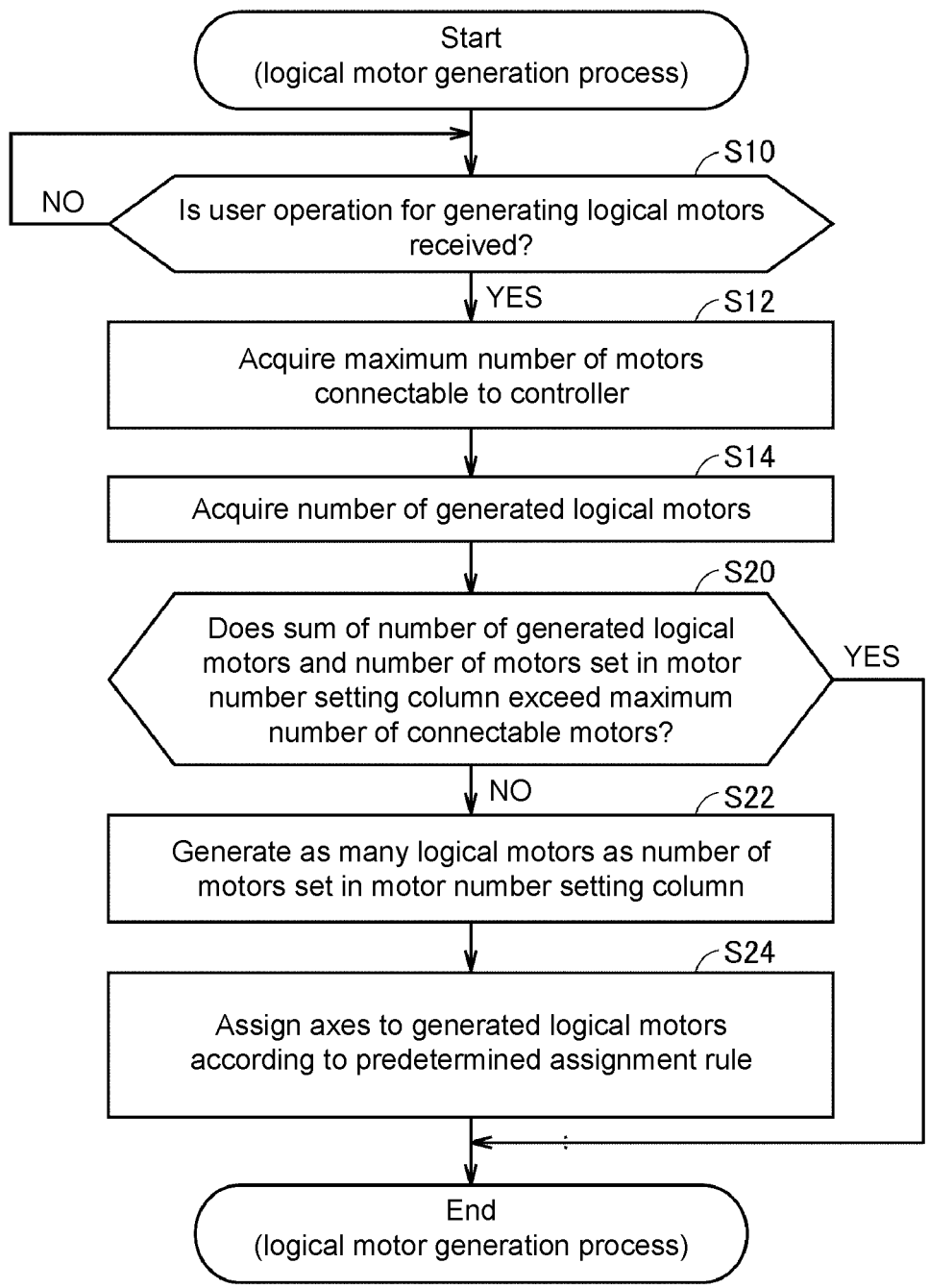
FIG. 18 is a flowchart illustrating a logical motor generation process.
Figure 19:
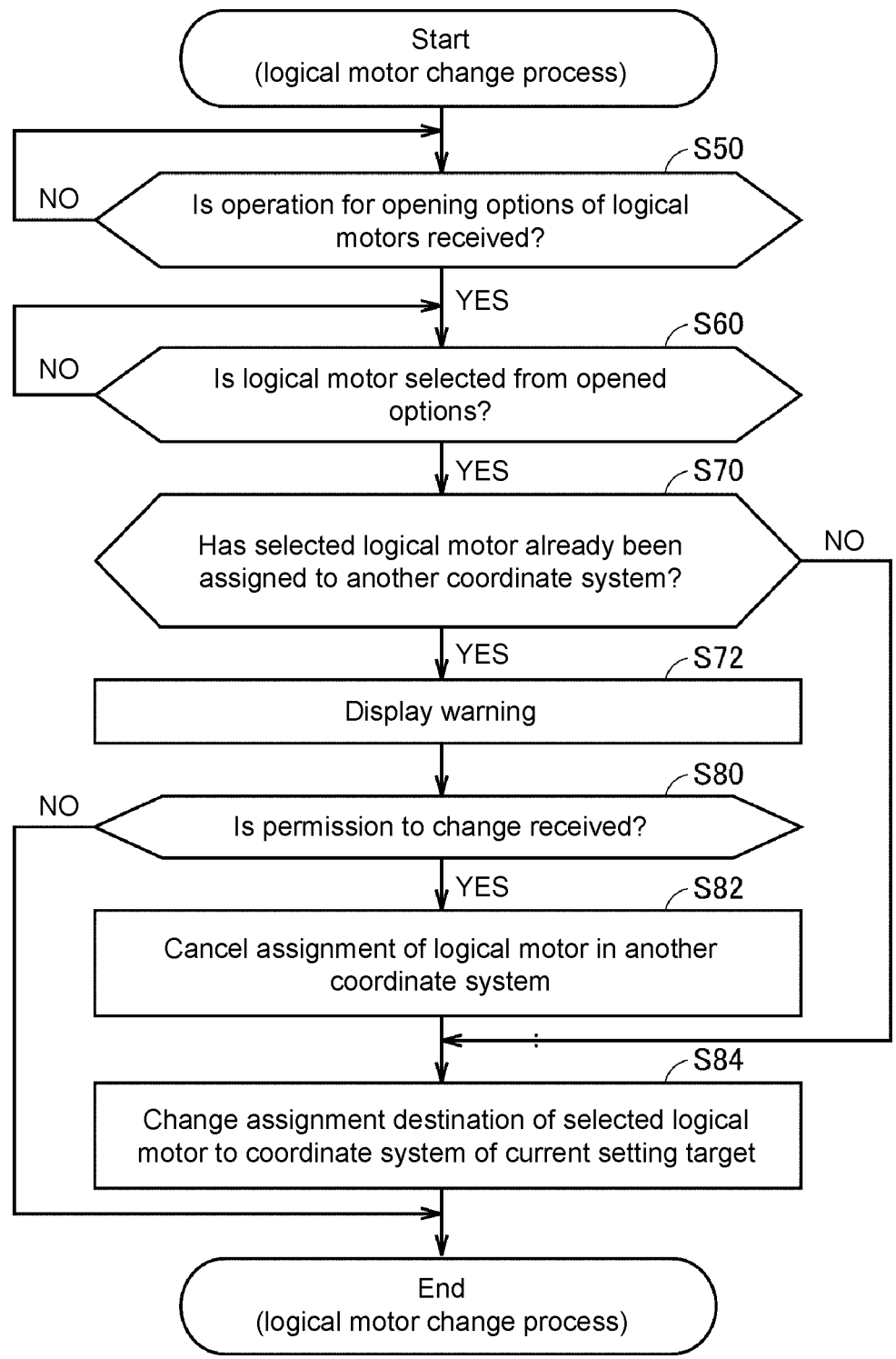
FIG. 19 is a flowchart illustrating a logical motor change process.
Figure 20:
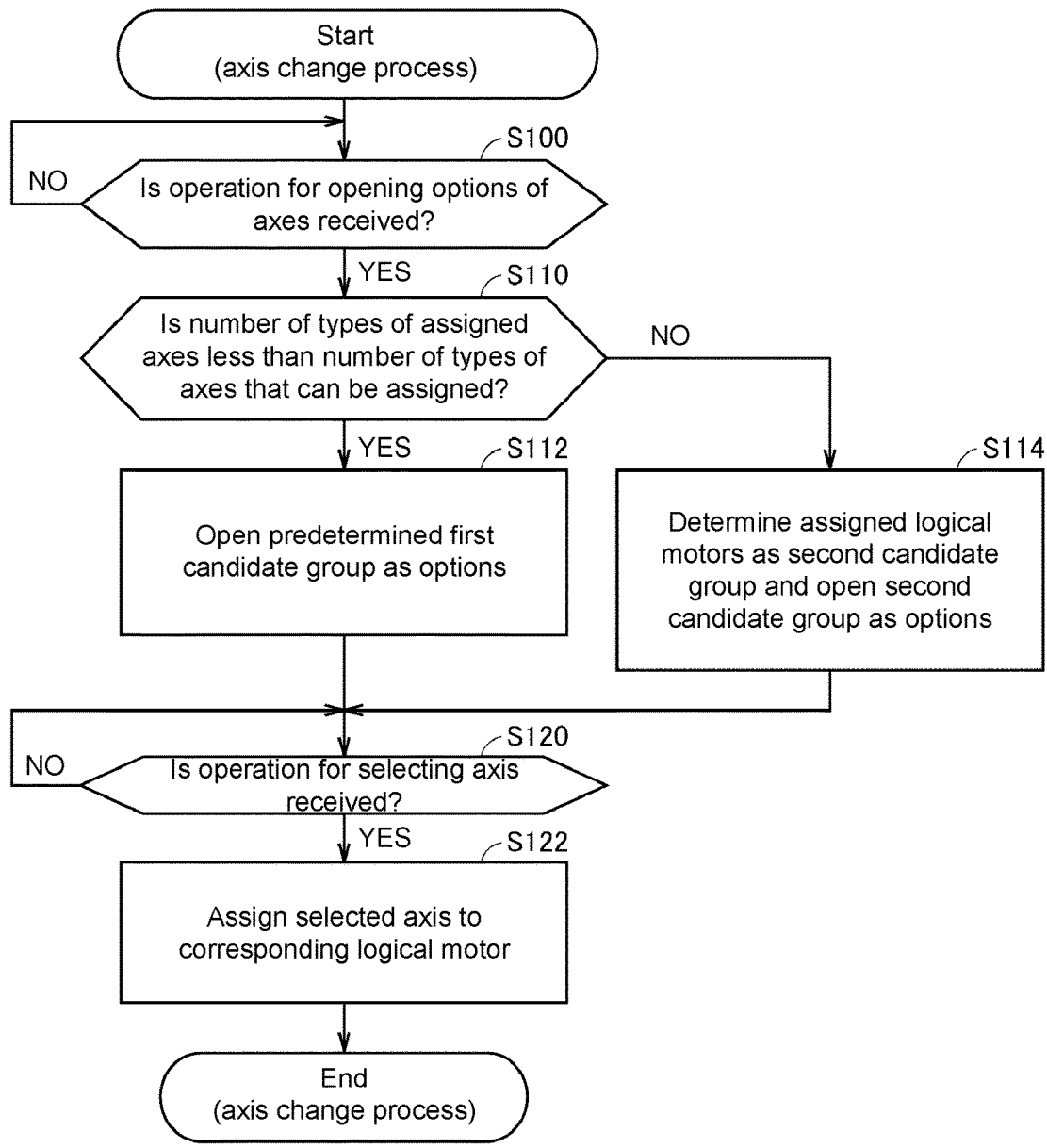
FIG. 20 is a flowchart illustrating a change process of axes assigned to logical motors.

A control structure of the information processing device 200 will be described with reference to FIGS. 18 to 20. FIG. 18 is a flowchart illustrating a logical motor generation process. FIG. 19 is a flowchart illustrating a logical motor change process. FIG. 20 is a flowchart illustrating a change process of axes assigned to logical motors. The processes of FIGS. 18 to 20 are realized by executing programs by the processor 202 of the information processing device 200. In other aspects, some or all of the processes may be executed by a circuit element or other hardware.

(i1. Logical Motor Generation Flow)

First, a logical motor generation process flow will be described with reference to FIG. 18.

In step S10, the processor 202 determines whether a user operation for generating logical motors is received. As an example, the user operation includes an operation of pressing the generation button 551 (refer to FIG. 6) on the user interface 500. The processor 202 switches control to step S12 when it is determined that the user operation for generating logical motors is received (YES in step S10). The processor 202 re-executes the process of step S10 when it is determined that the user operation for generating logical motors is not received (NO in step S10).

In step S12, the processor 202 acquires a maximum number of motors connectable to the controller, which is designated in the controller setting region 502 (refer to FIG. 2) of the user interface 500, with reference to the aforementioned controller information 224 (refer to FIG. 17).

In step S14, the processor 202 acquires the number of generated logical motors with reference to the aforementioned setting information 226.

In step S20, the processor 202 calculates the sum of the number of generated logical motors acquired in step S14 and the number of motors set in the motor number setting column 557 (refer to FIG. 6) of the user interface 500 and determines whether the sum exceeds the maximum number of motors acquired in step S12. The processor 202 ends the process illustrated in FIG. 18 when it is determined that the sum exceeds the maximum number of connectable motors (YES in step S20). The processor 202 switches control to step S22 when it is determined that the sum does not exceed the maximum number of connectable motors (NO in step S20).

In step S22, the processor 202 generates as many logical motors as the number of motors set in the motor number setting column 557 of the user interface 500 as the aforementioned generation unit 284 (refer to FIG. 17). Here, the processor 202 determines names of logical motors such that the logical motors do not have the same name according to a predetermined generation rule. As an example, the processor 202 differentiates logical motor names by assigning serial numbers to the logical motors. Alternatively, the information processing device 200 may differentiate the logical motor names by assigning consecutive letters to the logical motors.

In step S24, the processor 202 assigns axes to the generated logical motors according to a predetermined assignment rule as the aforementioned assignment unit 286 (refer to FIG. 17). As an example, the processor 202 assigns an axis to each logical motor such that the number of types of axes assigned to the logical motors does not exceed a predetermined number. For example, when the maximum number of axes that can be assigned is limited to four types, the processor 202 determines an axis assigned to each logical motor such that the number of types of axes to be assigned to the logical motors is within four types.

(i2. Logical Motor Change Flow)

Next, a logical motor change process flow will be described with reference to FIG. 19.

In step S50, the processor 202 determines whether an operation of opening options of logical motors is received. As an example, the operation includes an operation of pressing a combo box affixed to each logical motor on the user interface 500. The processor 202 switches control to step S60 when it is determined that the operation of opening options of logical motors is received (YES in step S50). The processor 202 re-executes the process of step S50 when it is determined that the operation of opening options of logical motors is not received (NO in step S50).

In step S60, the processor 202 determines whether a logical motor is selected from the opened options. The processor 202 switches control to step S70 when it is determined that a logical motor is selected from the opened options (YES in step S60). The processor 202 re-executes the process of step S60 when it is determined that no logical motor is selected from the opened options (NO in step S60).

In step S70, the processor 202 determines whether the selected logical motor has already been assigned to another coordinate system different from the coordinate system of the current setting target. Typically, the setting information 226 (refer to FIG. 17) for managing assignment of logical motors is prepared for each coordinate system type. When the selected logical motor is specified in setting information 226 different from the setting information 226 corresponding to the coordinate system of the current setting target, the processor 202 determines that the logical motor has already been assigned to the other coordinate system. The processor 202 switches control to step S72 when it is determined that the selected logical motor has already been assigned to the other coordinate system (YES in step S70). The processor 202 switches control to step S84 when it is determined that the selected logical motor has not been assigned to the other coordinate system (NO in step S70).

In step S72, the processor 202 displays on the user interface 500 the warning 580 (refer to FIG. 11) indicating that the logical motor selected in step S60 has already been assigned to the other coordinate system.

In step S80, the processor 202 determines whether an operation of permitting the logical motor selected in step S60 to be assigned to the coordinate system of the current setting target is received. As an example, the operation includes an operation of pressing the OK button 581 (refer to FIG. 11) on the warning 580 displayed in step S72. The processor 202 switches control to step S82 when it is determined that the operation of pressing the OK button 581 is received (YES in step S80). The processor 202 ends the process illustrated in FIG. 19 when it is determined that the operation of pressing the OK button 581 is not received (NO in step S80).

In step S82, the processor 202 cancels assignment of the logical motor selected in step S60 to the other coordinate system. More specifically, the processor 202 deletes assignment information of the logical motor from the setting information 226 (Refer to FIG. 17) corresponding to the other coordinate system.

In step S84, the processor 202 changes an assignment destination of the logical motor selected in step S60 from the other coordinate system to the coordinate system of the current setting target. More specifically, the processor 202 adds information of the logical motor selected in step S60 to the setting information 226 (refer to FIG. 17) corresponding to the coordinate system of the current setting target.

(i3. Logical Motor Change Flow)

Next, a flow of a change process of an axis assigned to a logical motor will be described with reference to FIG. 20.

In step S100, the processor 202 determines whether an operation of opening options of axes for logical motors is received. As an example, the operation includes an operation of pressing the combo box affixed to each logical motor on the user interface 500. The processor 202 switches control to step S110 when it is determined that the operation of opening options of axes for logical motors is received (YES in step S100). The processor 202 re-executes the process of step S100 when it is determined that the operation of opening options of axes for logical motors is not received (NO in step S100).

In step S110, the processor 202 determines whether the number of types of assigned axes is less than the maximum number of axes that can be assigned. The processor 202 switches control to step S112 when it is determined that the number of types of assigned axes is less than the maximum number of axes that can be assigned (YES in step S110). The processor 202 switches control to step S114 when it is determined that the number of types of assigned axes is not less than the maximum number of axes that can be assigned (NO in step S110).

In step S112, the processor 202 opens a predetermined first candidate group as options of axes on the user interface 500. For example, it is assumed that the maximum number of axes that can be assigned is set to four types and three types of axes have already been assigned to registered logical motors. In this case, the processor 202 sets all predetermined axes (e.g., the X axis, the Y axis, the Z axis, the A axis, the B axis and the C axis) as the first candidate group and opens the first candidate group as options.

In step S114, the processor 202 sets an axis that has already been assigned to each logical motor to a second candidate group and opens the second candidate group as options of axes on the user interface 500. For example, it is assumed that the maximum number of axes that can be assigned is set to four types and four types of axes have already been assigned to registered logical motors. In this case, the processor 202 sets the assigned four types of axes as the second candidate group and opens the second candidate group as options.

In step S120, the processor 202 determines whether an operation of selecting an axis from a candidate group opened on the user interface 500 is received. The processor 202 switches control to step S122 when it is determined that the operation of selecting an axis from the candidate group opened on the user interface 500 is received (YES in step S120). The processor 202 re-executes the process of step S120 when it is determined that the operation of selecting an axis from the candidate group opened on the user interface 500 is not received (NO in step S120).

In step S122, the processor 202 assigns the selected axis to a logical motor corresponding thereto. More specifically, the processor 202 associates the selected axis with the corresponding logical motor and then writes such information in the setting information 226 (refer to FIG. 17).

J. Conclusion

As described above, the information processing device 200 generates a logical motor for designating each of a plurality of motors which drive the same control target on the basis of reception of a predetermined user operation. Then, the information processing device 200 assigns any one of a plurality of axes which define a predetermined coordinate system to the generated logical motor. In this manner, the function of automatically generating logical motors is implemented, and thus setting related to a motor is simplified and man-hours for designing the NC program are reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An information processing device for performing setting related to a motor, comprising:
   a generation unit which generates a plurality of pieces of motor information for designating each of a plurality of motors for driving a same control target on the basis of reception of a predetermined user operation; and
   an assignment unit which assigns each of the generated plurality of pieces of motor information to any one of a plurality of axes defining a predetermined coordinate system,
   a providing unit which provides a user interface through which a setting related to the generated plurality of pieces of motor information is received,
   wherein the user interface is configured to receive a setting of a number of motors, and
   the generation unit generates as many pieces of motor information as the number of motors on the basis of reception of the predetermined user operation,
   wherein the user interface displays the generated plurality of pieces of motor information and displays an axis assigned to each piece of motor information in parallel with each piece of motor information,
   wherein the user interface is configured to designate an axis assigned to each of a plurality of pieces of motor information in a predetermined first candidate group when a number of types of axes assigned to the plurality of pieces of motor information is less than a predetermined number, and is configured to set an axis that has already been assigned to each piece of motor information to a second candidate group and designate an axis assigned to each piece of motor information in the second candidate group when the number of types of axes assigned to the plurality of pieces of motor information is equal to or greater than the predetermined number.

2. The information processing device according to claim 1, wherein the generation unit generates the plurality of pieces of motor information such that the plurality of pieces of motor information do not overlap.

3. An information processing method for performing setting related to a motor, comprising:
   a step of generating a plurality of pieces of motor information for designating each of a plurality of motors for driving a same control target on the basis of reception of a predetermined user operation; and
   a step of assigning each of the generated plurality of pieces of motor information to any one of a plurality of axes defining a predetermined coordinate system,
   providing a user interface through which a setting related to the generated plurality of pieces of motor information is received,
   wherein the user interface receives a setting of a number of motors, and
   pieces of motor information as many as the number of motors are generated on the basis of reception of the predetermined user operation,
   wherein the user interface displays the generated plurality of pieces of motor information and displays an axis assigned to each piece of motor information in parallel with each piece of motor information,
   wherein the user interface designates an axis assigned to each of a plurality of pieces of motor information in a predetermined first candidate group when a number of types of axes assigned to the plurality of pieces of motor information is less than a predetermined number, and sets an axis that has already been assigned to each piece of motor information to a second candidate group and designate an axis assigned to each piece of motor information in the second candidate group when the number of types of axes assigned to the plurality of pieces of motor information is equal to or greater than the predetermined number.

4. A non-transitory recording medium storing an information processing program for performing setting related to a motor, which causes an information processing device to execute:
   a step of generating a plurality of pieces of motor information for designating each of a plurality of motors for driving a same control target on the basis of reception of a predetermined user operation; and
   a step of assigning each of the generated plurality of pieces of motor information to any one of a plurality of axes defining a predetermined coordinate system,
   providing a user interface through which a setting related to the generated plurality of pieces of motor information is received,
   wherein the user interface receives a setting of a number of motors, and
   pieces of motor information as many as the number of motors are generated on the basis of reception of the predetermined user operation,
   wherein the user interface displays the generated plurality of pieces of motor information and displays an axis assigned to each piece of motor information in parallel with each piece of motor information,
   wherein the user interface designates an axis assigned to each of a plurality of pieces of motor formation m a predetermined first candidate group when a number of types of axes assigned to the plurality of pieces of motor information is less than a predetermined number, and sets an axis that has already been assigned to each piece of motor information to a second candidate group and designate an axis assigned to each piece of motor information in the second candidate group when the number of types of axes assigned to the plurality of pieces of motor information is equal to or greater than the predetermined number.

* * * * *